US012741808B2

United States Patent

Steffens et al.

(10) Patent No.: US 12,741,808 B2
(45) Date of Patent: Sep. 22, 2026

(54) REFUSE VEHICLE WITH AN AUTOMATICALLY EJECTING PACK PANEL

(71) Applicant: Oshkosh Corporation, Oshkosh, WI (US)

(72) Inventors: Greg Steffens, Oshkosh, WI (US); Chris Mills, Oshkosh, WI (US); Aaron Fisher, Oshkosh, WI (US); Amanda Miller, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 529 days.

(21) Appl. No.: 18/342,603

(22) Filed: Jun. 27, 2023

(65) Prior Publication Data

US 2023/0415985 A1 Dec. 28, 2023

Related U.S. Application Data

(60) Provisional application No. 63/356,123, filed on Jun. 28, 2022.

(51) Int. Cl.
*B65F 3/28* (2006.01)
*B65F 3/14* (2006.01)
*B65F 3/20* (2006.01)

(52) U.S. Cl.
CPC ................ *B65F 3/28* (2013.01); *B65F 3/201* (2013.01); *B65F 2003/146* (2013.01)

(58) Field of Classification Search
CPC .......... B60P 1/003; B60P 1/006; B65F 3/201; B65F 3/28; B65F 2003/146
USPC ............................................. 414/517, 525.6
See application file for complete search history.

(56) References Cited

U.S. PATENT DOCUMENTS 4,020,962 A * 5/1977 Colin ........................ B65F 3/28 414/525.5
5,816,766 A * 10/1998 Clark ........................ B65F 3/28 414/525.3
6,079,933 A * 6/2000 Moyna .................... B60P 1/006 414/509
6,632,066 B1 * 10/2003 Kojima .................. B60P 1/006 414/521

(Continued)

FOREIGN PATENT DOCUMENTS

EP 2944585 A1 * 11/2015 .............. B65F 3/201
GB 2087791 A * 6/1982 ........... B30B 9/3007

OTHER PUBLICATIONS

McNeilus Truck and Manufacturing, Inc.(2010). Operator's Manual: Zero Radius. Retrieved from https://bigtruckrental.com/wp-content/uploads/2019/01/Zero-Radius.pdf.

*Primary Examiner* — James Keenan
(74) *Attorney, Agent, or Firm* — Foley & Lardner LLP

(57) ABSTRACT

A refuse vehicle includes a chassis, a cab coupled to the chassis, a refuse compartment supported by the chassis and having a storage volume and a hopper volume, a packing assembly including a pack panel and a packing actuator, and an ejection input configured to automatically initiate an ejection procedure upon activation of the ejection input. The packing actuator is configured to selectively move the pack panel between a retracted position and an extended position. The ejection procedure includes extending the pack panel to a plurality of extended positions between the retracted position and the extended position.

14 Claims, 22 Drawing Sheets

(56) References Cited

U.S. PATENT DOCUMENTS

| | | | | |
|---|---|---|---|---|
| 8,123,454 | B2 * | 2/2012 | Hallstrom | B65G 25/065 198/750.2 |
| 9,428,334 | B2 * | 8/2016 | Whitfield, Jr. | B65F 3/041 |
| 11,148,880 | B1 * | 10/2021 | Koga | B60R 25/01 |
| 2004/0002794 | A1 | 1/2004 | Pillar et al. | |
| 2005/0113996 | A1 | 5/2005 | Pillar et al. | |
| 2005/0234622 | A1 | 10/2005 | Pillar et al. | |
| 2006/0127208 | A1 * | 6/2006 | Worthington | B65F 3/28 414/517 |
| 2008/0114513 | A1 | 5/2008 | Pillar et al. | |
| 2015/0210313 | A1 | 7/2015 | Sears et al. | |
| 2020/0290237 | A1 | 9/2020 | Steffens et al. | |
| 2020/0291846 | A1 | 9/2020 | Steffens et al. | |
| 2021/0121340 | A1 | 4/2021 | Malcolm et al. | |
| 2021/0276423 | A1 | 9/2021 | Lombardo et al. | |
| 2021/0276847 | A1 | 9/2021 | Neubauer et al. | |
| 2021/0276848 | A1 | 9/2021 | Miller et al. | |
| 2021/0369515 | A1 | 12/2021 | Malcolm et al. | |
| 2022/0000686 | A1 | 1/2022 | Malcolm et al. | |
| 2022/0072736 | A1 | 3/2022 | Steffens et al. | |
| 2022/0118854 | A1 | 4/2022 | Davis et al. | |
| 2022/0135385 | A1 | 5/2022 | Lombardo et al. | |
| 2022/0204332 | A1 | 6/2022 | Miller et al. | |
| 2022/0211560 | A1 | 7/2022 | Malcolm et al. | |
| 2022/0234873 | A1 | 7/2022 | Miller et al. | |
| 2023/0150584 | A1 | 5/2023 | Zeamer et al. | |
| 2023/0150763 | A1 | 5/2023 | Haberlein et al. | |
| 2023/0191887 | A1 | 6/2023 | Rausch et al. | |
| 2023/0192401 | A1 | 6/2023 | Zeamer et al. | |
| 2023/0211705 | A1 | 7/2023 | Zeamer et al. | |
| 2023/0278425 | A1 | 9/2023 | Miller et al. | |
| 2023/0278475 | A1 | 9/2023 | Steffens et al. | |

* cited by examiner

REFUSE VEHICLE WITH AN AUTOMATICALLY EJECTING PACK PANEL

CROSS-REFERENCE TO RELATED PATENT APPLICATIONS

This application claims the benefit of and priority to U.S. Provisional Application No. 63/356,123, filed on Jun. 28, 2022, the entire disclosure of which is hereby incorporated by reference herein.

BACKGROUND

The present disclosure relates generally to vehicles. More specifically, the present disclosure relates to a refuse vehicle that travels from location to location to pick and transport refuse from refuse containers along a travel route.

SUMMARY

One embodiment relates to a refuse vehicle that includes a chassis, a cab coupled to the chassis, a refuse compartment supported by the chassis and having a storage volume and a hopper volume, a packing assembly having a pack panel and a packing actuator, and an ejection input configured to automatically initiate an ejection procedure upon activation of the ejection input. The packing actuator is configured to selectively move the pack panel between a retracted position and an extended position. The ejection procedure includes extending the pack panel to a plurality of extended positions between the retracted position and the extended position.

One embodiment relates to a refuse vehicle that includes a chassis, a cab coupled to the chassis, a refuse compartment supported by the chassis and including a storage volume and a hopper volume, a tailgate pivotally coupled to the refuse compartment and movable between an open position and a closed position, a tailgate sensor configured to detect a position of the tailgate and provide an indication of whether the tailgate is in the open position or the closed position, a packing assembly including a pack panel and a packing actuator, and a controller having a processor and at least one memory. The packing actuator is configured to selectively move the pack panel between a retracted position and an extended position. The controller is in communication with the tailgate sensor and the packing actuator and is configured to: determine if the tailgate is in the open position or the closed position, in response to determining that the tailgate is in the closed position, prevent the packing actuator from performing the ejection procedure, and in response to determining that the tailgate is in the open position, initiate the ejection procedure upon activation of an ejection input. The ejection procedure sequentially extends the pack panel to a plurality of extended positions between the retracted position and the extended position.

One embodiment relates to a method of initiating an ejection procedure on a refuse vehicle. The method includes determining if a tailgate is in an open position or a closed position, upon determining that the tailgate is in the closed position, preventing a packing actuator from extending past a retracted position, and upon determining that the tailgate is in the open position and receiving an activation of an ejection input, automatically initiating an ejection procedure where the packing actuator extends a pack panel to a plurality of extended positions between the retracted position and an extended position.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle (e.g., a refuse vehicle) includes an ejection input (e.g., a button, a switch, a joystick, a soft key on a display, etc.) that, when activated, automatically initiates an ejection procedure. The ejection procedure includes extending a pack panel back and forth between a retracted position and a plurality of extended positions. In general, conventional ejection procedures are manually controller by a user of the vehicle, which lacks precise control of the pack panel and may result in refuse falling behind the pack panel due to improper control of the pack panel position during the ejection procedure. Incorporating the ejection input into the vehicle enables the ejection procedure to be automatically initiated and the positions of the pack panel during the ejection procedure are controlled to inhibit or prevent refuse from falling behind the pack panel.

In some embodiments, the ejection procedure include extending the pack panel to a first position, a second position, a third position, and the extended position. The first position, the second position, and the third position sequentially position the pack panel closer to the extended position. Gradually increasing extension of the pack panel, accompanied with retracting back to the retracted position in between each extension, maintains refuse in front of the pack panel and shakes refuse off of the pack panel, which helps prevent or inhibit refuse from falling behind the pack panel.

Overall Vehicle

Figure 1:
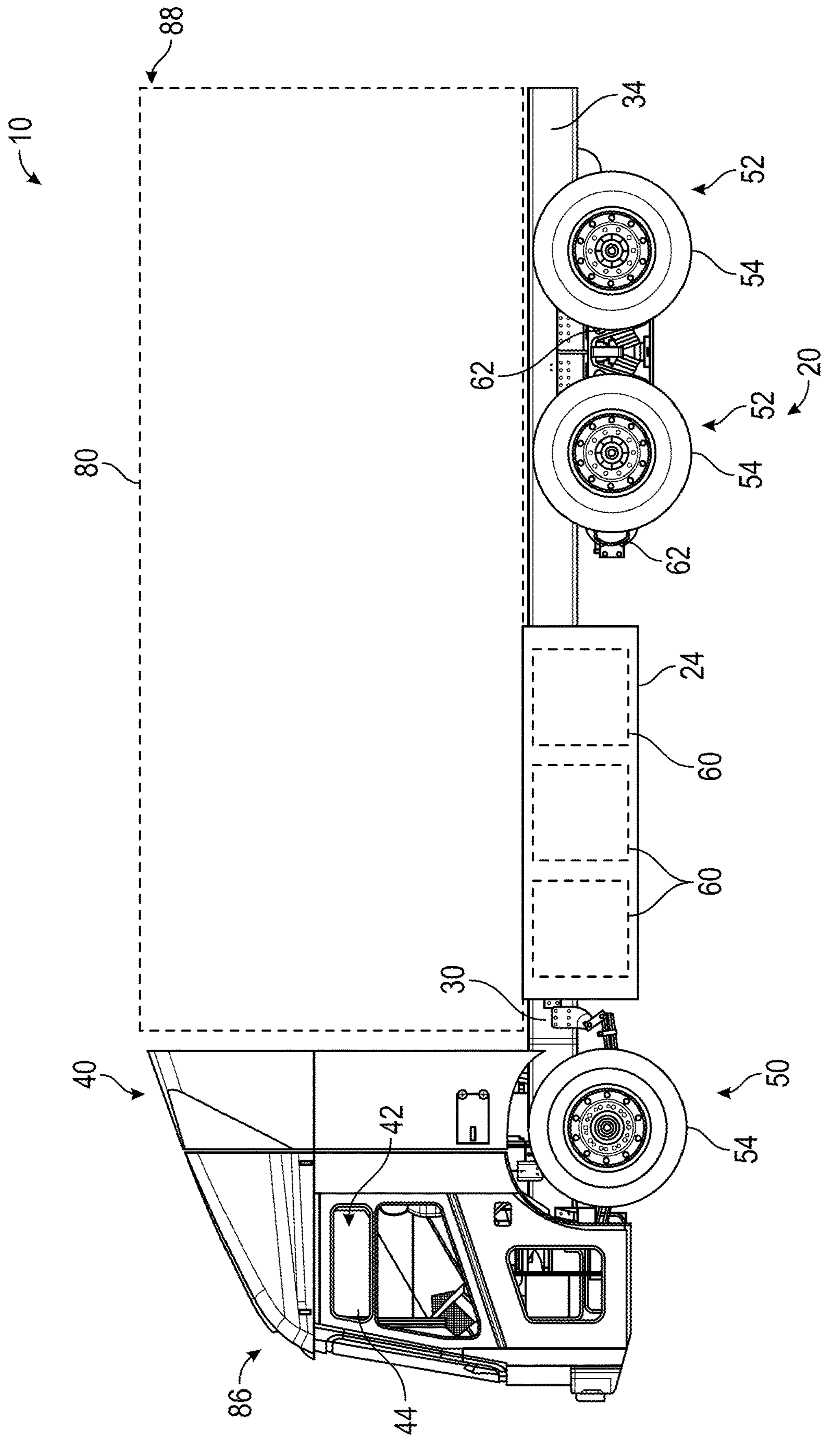
FIG. 1 is a left side view of a vehicle, according to an exemplary embodiment.
Figure 2:
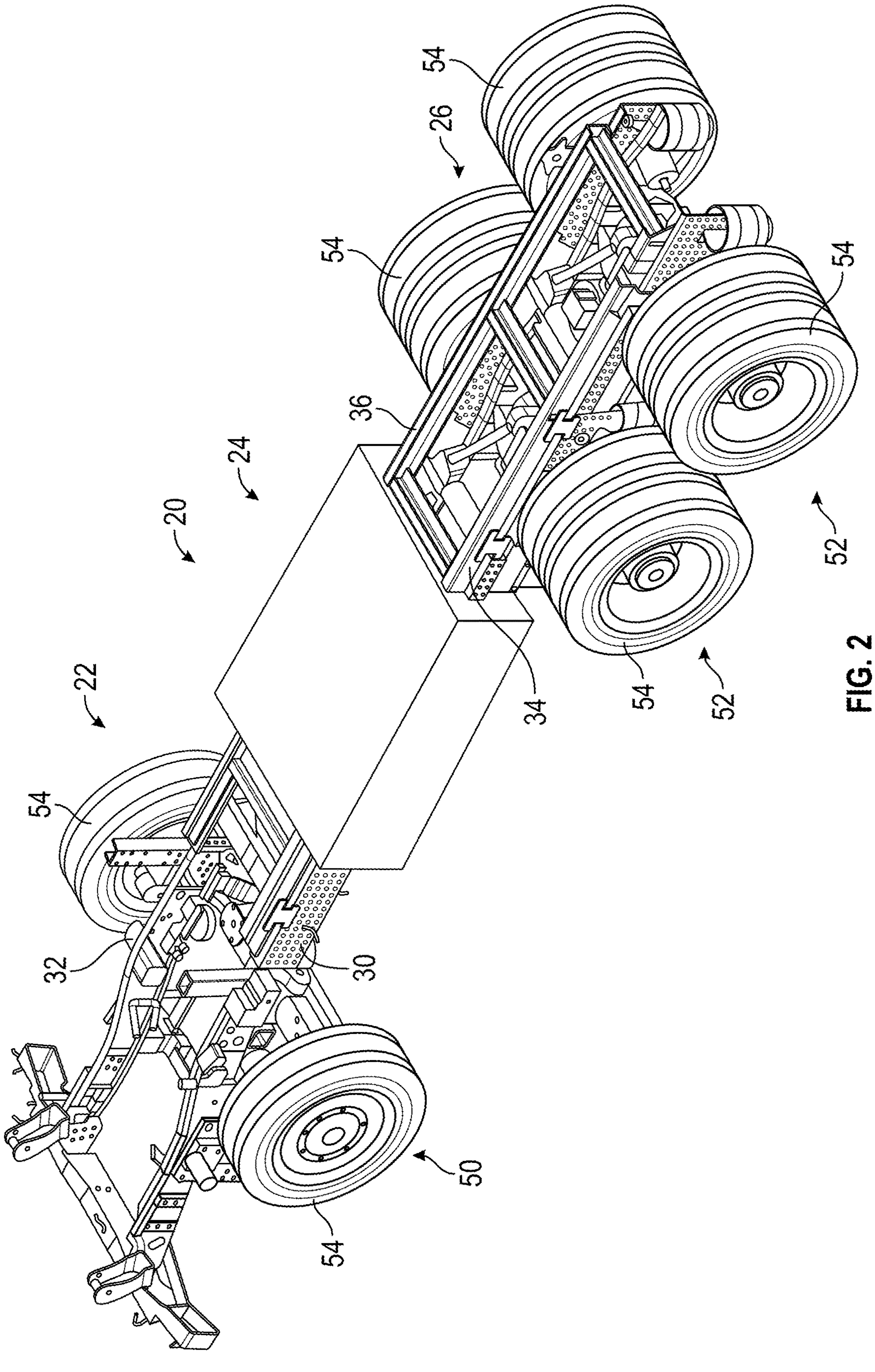
FIG. 2 is a perspective view of a chassis of the vehicle of FIG. 1.

Referring to FIGS. 1 and 2, a reconfigurable vehicle (e.g., a vehicle assembly, a truck, a vehicle base, etc.) is shown as vehicle 10, according to an exemplary embodiment. As shown, the vehicle 10 includes a frame assembly or chassis assembly, shown as chassis 20, that supports other components of the vehicle 10. The chassis 20 extends longitudinally along a length of the vehicle 10, substantially parallel to a primary direction of travel of the vehicle 10. As shown, the chassis 20 includes three sections or portions, shown as front section 22, middle section 24, and rear section 26. The middle section 24 of the chassis 20 extends between the front section 22 and the rear section 26. In some embodiments, the middle section 24 of the chassis 20 couples the front section 22 to the rear section 26. In other embodiments, the front section 22 is coupled to the rear section 26 by another component (e.g., the body of the vehicle 10).

As shown in FIG. 2, the front section 22 includes a pair of frame portions, frame members, or frame rails, shown as front rail portion 30 and front rail portion 32. The rear section 26 includes a pair of frame portions, frame members, or frame rails, shown as rear rail portion 34 and rear rail portion 36. The front rail portion 30 is laterally offset from the front rail portion 32. Similarly, the rear rail portion 34 is laterally offset from the rear rail portion 36. This spacing may provide frame stiffness and space for vehicle components (e.g., batteries, motors, axles, gears, etc.) between the frame rails. In some embodiments, the front rail portions 30 and 32 and the rear rail portions 34 and 36 extend longitudinally and substantially parallel to one another. The chassis 20 may include additional structural elements (e.g., cross members that extend between and couple the frame rails).

In some embodiments, the front section 22 and the rear section 26 are configured as separate, discrete subframes (e.g., a front subframe and a rear subframe). In such embodiments, the front rail portion 30, the front rail portion 32, the rear rail portion 34, and the rear rail portion 36 are separate, discrete frame rails that are spaced apart from one another. In some embodiments, the front section 22 and the rear section 26 are each directly coupled to the middle section 24 such that the middle section 24 couples the front section 22 to the rear section 26. Accordingly, the middle section 24 may include a structural housing or frame. In other embodiments, the front section 22, the middle section 24, and the rear section 26 are coupled to one another by another component, such as a body of the vehicle 10.

In other embodiments, the front section 22, the middle section 24, and the rear section 26 are defined by a pair of frame rails that extend continuously along the entire length of the vehicle 10. In such an embodiment, the front rail portion 30 and the rear rail portion 34 would be front and rear portions of a first frame rail, and the front rail portion 32 and the rear rail portion 36 would be front and rear portions of a second frame rail. In such embodiments, the middle section 24 would include a center portion of each frame rail.

In some embodiments, the middle section 24 acts as a storage portion that includes one or more vehicle components. The middle section 24 may include an enclosure that contains one or more vehicle components and/or a frame that supports one or more vehicle components. By way of example, the middle section 24 may contain or include one or more electrical energy storage devices (e.g., batteries, capacitors, etc.). By way of another example, the middle section 24 may include fuel tanks fuel tanks. By way of yet another example, the middle section 24 may define a void space or storage volume that can be filled by a user.

A cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42, that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. By way of example, the cab interior 42 may contain components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

The vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. By way of example, the vehicle 10 may include a tag axle that may be raised or lowered to accommodate variations in weight being carried by the vehicle 10. The front axle 50 and the rear axles 52 each include a series of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. Referring to FIG. 1, the vehicle 10 includes one or more electrical energy storage devices (e.g., batteries, capacitors, etc.), shown as batteries 60. As shown, the batteries 60 are positioned within the middle section 24 of the chassis 20. In other embodiments, the batteries 60 are otherwise positioned throughout the vehicle 10. The vehicle further includes one or more electromagnetic devices or prime movers (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 64 and provide electrical energy to the batteries 60, providing a braking force to slow the vehicle 10.

The batteries 60 may include one or more rechargeable batteries (e.g., lithium-ion batteries, nickel-metal hydride batteries, lithium-ion polymer batteries, lead-acid batteries, nickel-cadmium batteries, etc.). The batteries 60 may be charged by one or more sources of electrical energy onboard the vehicle 10 (e.g., solar panels, etc.) or separate from the vehicle 10 (e.g., connections to an electrical power grid, a wireless charging system, etc.). As shown, the drive motors 62 are positioned within the rear axles 52 (e.g., as part of a combined axle and motor assembly). In other embodiments, the drive motors 62 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may combust fuel (e.g., gasoline, diesel, etc.) to provide mechanical energy, which a transmission may receive and provide to the axle front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 may further be configured to support non-hybrid powertrains. For example, the powertrain system may include a primary driver that is a compression-ignition internal combustion engine that utilizes diesel fuel.

Referring to FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 3-13 illustrate various examples of how the vehicle 10 may be configured for specific applications. Although only a certain set of vehicle configurations is shown, it should be understood that the vehicle 10 may be configured for use in other applications that are not shown.

The application kit 80 may include various actuators to facilitate certain functions of the vehicle 10. By way of example, the application kit 80 may include hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. By way of example, the application kit 80 may include hydraulic or pneumatic components that form a hydraulic or pneumatic circuit (e.g., conduits, valves, pumps, compressors, gauges, reservoirs, accumulators, etc.). By way of another example, the application kit 80 may include electrical components (e.g., batteries, capacitors, voltage regulators, motor controllers, etc.). The actuators may be powered by components of the vehicle By way of example, the actuators may be powered by the batteries 60, the drive motors 62, or the primary driver (e.g., through a power take off).

The vehicle 10 generally extends longitudinally from a front side 86 to a rear side 88. The front side 86 is defined by the cab 40 and/or the chassis. The rear side 88 is defined by the application kit 80 and/or the chassis 20. The primary, forward direction of travel of the vehicle is longitudinal, with the front side 86 being arranged forward of the rear side 88.

A. Front-Loading Refuse Vehicle

Figure 3:
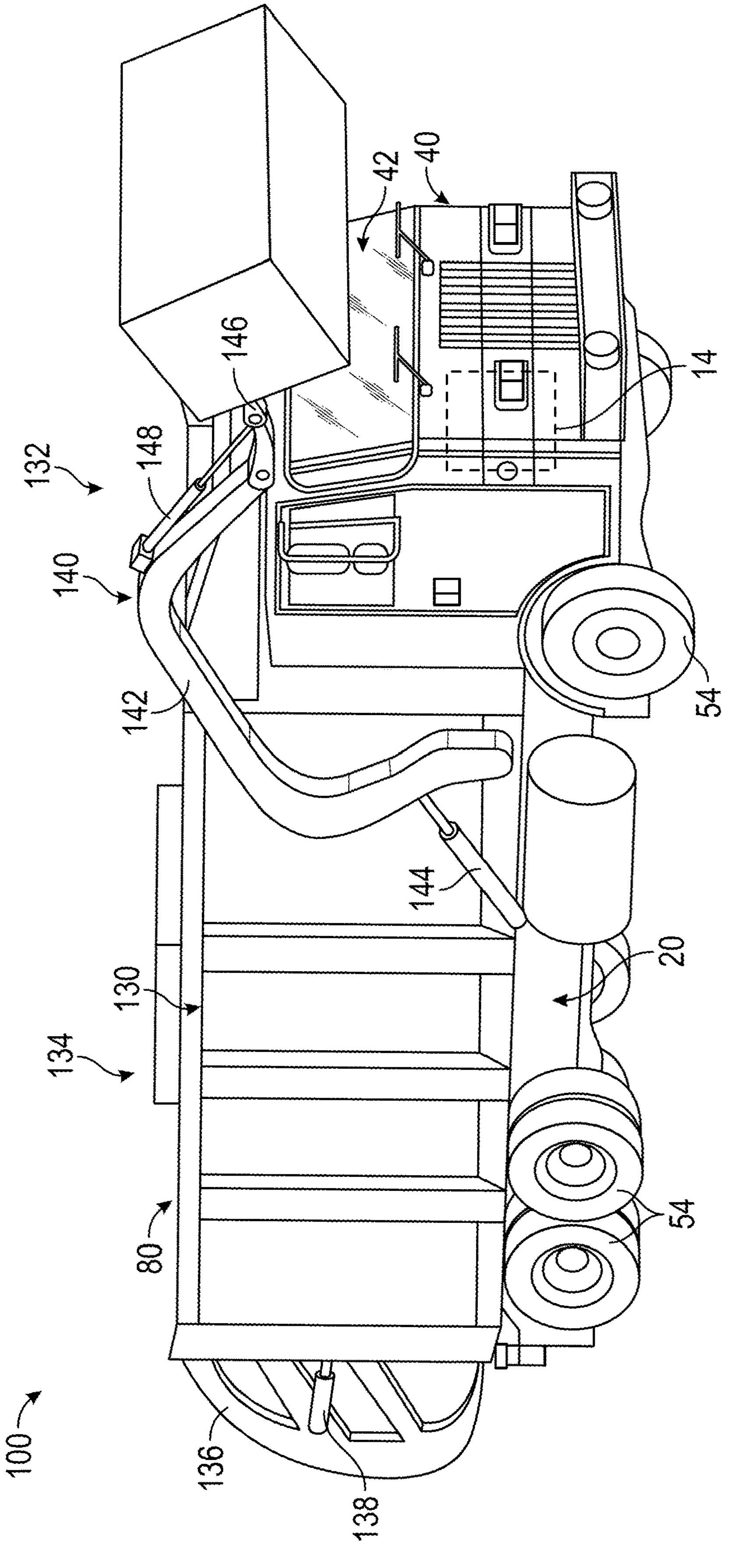
FIG. 3 is a perspective view of the vehicle of FIG. 1 configured as a front-loading refuse vehicle, according to an exemplary embodiment.
Figure 4:
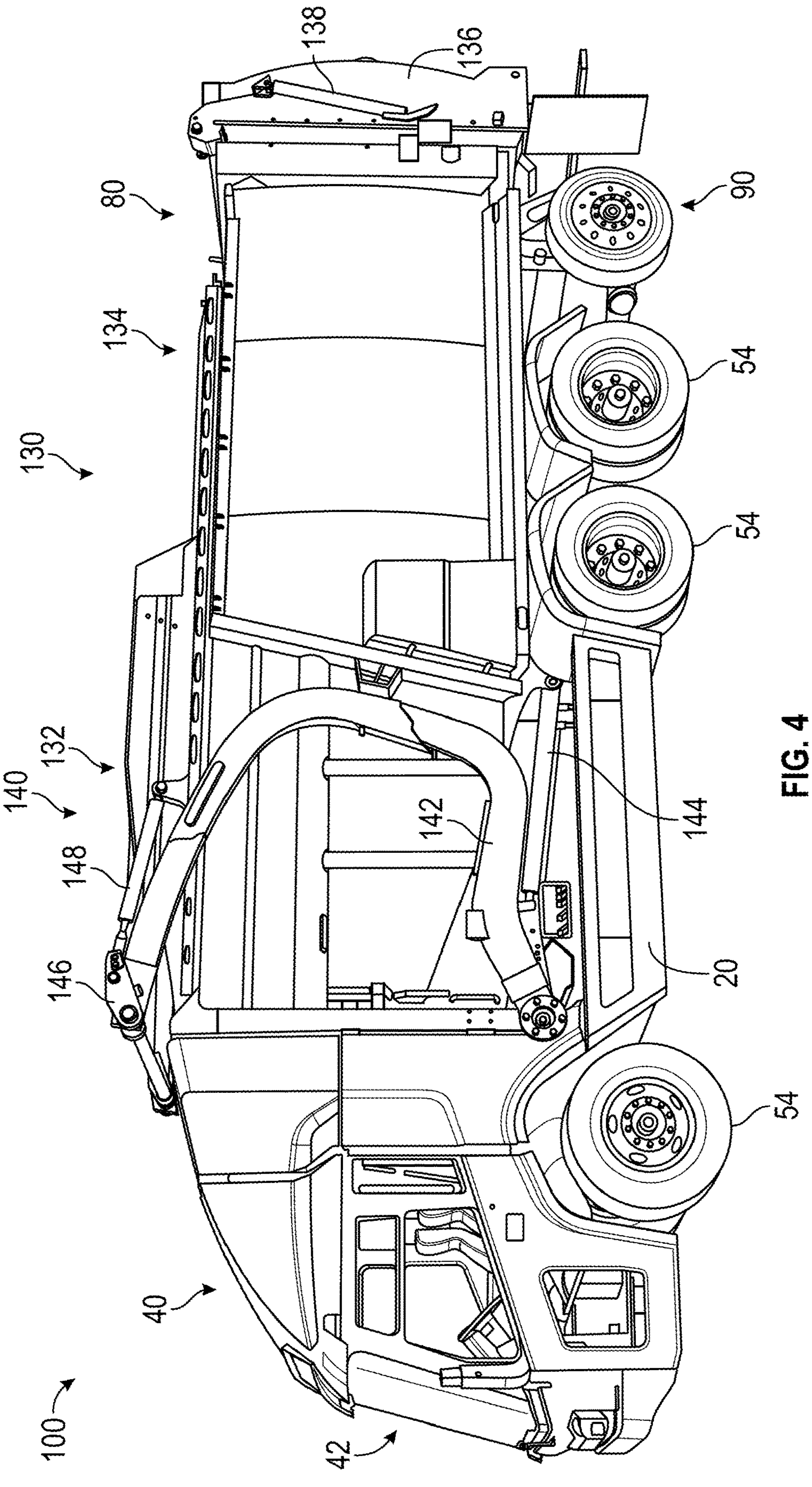
FIG. 4 is a left side view of the front-loading refuse vehicle of FIG. 3 configured with a tag axle.

Referring now to FIGS. 3 and 4, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a front-loading refuse vehicle. The refuse vehicle 100 may be configured to transport refuse from various waste receptacles (e.g., refuse containers) within a municipality to a storage and/or processing facility (e.g., a landfill, an incineration facility, a recycling facility, etc.).

FIG. 4 illustrates the refuse vehicle 100 of FIG. 3 configured with a liftable axle, shown as tag axle 90, including a pair of wheel and tire assemblies 54. As shown, the tag axle 90 is positioned reward of the rear axles 52. The tag axle 90 can be selectively raised and lowered (e.g., by a hydraulic actuator) to selectively engage the wheel and tire assemblies 54 of the tag axle 90 with the ground. The tag axle 90 may be raised to reduce rolling resistance experienced by the refuse vehicle 100. The tag axle 90 may be lowered to distribute the loaded weight of the vehicle 100 across a greater number of a wheel and tire assemblies 54 (e.g., when the refuse vehicle 100 is loaded with refuse).

As shown in FIGS. 3 and 4, the application kit 80 of the refuse vehicle 100 includes a series of panels that form a rear body or container, shown as refuse compartment 130. The refuse compartment 130 may facilitate transporting refuse from various waste receptacles within a municipality to a storage and/or a processing facility (e.g., a landfill, an incineration facility, a recycling facility, etc.). By way of example, loose refuse may be placed into the refuse compartment 130 where it may be compacted (e.g., by a packer system within the refuse compartment 130). The refuse compartment 130 may also provide temporary storage for refuse during transport to a waste disposal site and/or a recycling facility. In some embodiments, the refuse compartment 130 may define a hopper volume 132 and storage volume 134. In this regard, refuse may be initially loaded into the hopper volume 132 and later compacted into the storage volume 134. As shown, the hopper volume 132 is positioned between the storage volume 134 and the cab 40 (e.g., refuse is loaded into a portion of the refuse compartment 130 behind the cab 40 and stored in a portion further toward the rear of the refuse compartment 130). In other embodiments, the storage volume may be positioned between the hopper volume and the cab 40 (e.g., in a rear-loading refuse truck, etc.). The application kit 80 of the refuse vehicle 100 further includes a pivotable rear portion, shown as tailgate 136, that is pivotally coupled to the refuse compartment 130. The tailgate 136 may be selectively repositionable between a closed position and an open position by an actuator (e.g., a hydraulic cylinder, an electric linear actuator, etc.), shown as tailgate actuator 138 (e.g., to facilitate emptying the storage volume).

As shown in FIGS. 3 and 4, the refuse vehicle 100 also includes an implement, shown as lift assembly 140, which is a front-loading lift assembly. According to an exemplary embodiment, the lift assembly 140 includes a pair of lift arms 142 and a pair of actuators (e.g., hydraulic cylinders, electric linear actuators, etc.), shown as lift arm actuators 144. The lift arms 142 may be rotatably coupled to the chassis 20 and/or the refuse compartment 130 on each side of the refuse vehicle 100 (e.g., through a pivot, a lug, a shaft, etc.), such that the lift assembly 140 may extend forward relative to the cab 40 (e.g., a front-loading refuse truck, etc.). In other embodiments, the lift assembly 140 may extend rearward relative to the application kit 80 (e.g., a rear-loading refuse truck). As shown in FIGS. 3 and 4, in an exemplary embodiment the lift arm actuators 144 may be positioned such that extension and retraction of the lift arm actuators 144 rotates the lift arms 142 about an axis extending through the pivot. In this regard, the lift arms 142 may be rotated by the lift arm actuators 144 to lift a refuse container over the cab 40. The lift assembly 140 further includes a pair of interface members, shown as lift forks 146, each pivotally coupled to a distal end of one of the lift arms 142. The lift forks 146 may be configured to engage a refuse container (e.g., a dumpster) to selectively coupled the refuse container to the lift arms 142. By way of example, each of the lift forks 146 may be received within a corresponding pocket defined by the refuse container. A pair of actuators (e.g., hydraulic cylinders, electric linear actuators, etc.), shown as articulation actuators 148, are each coupled to one of the lift arms 142 and one of the lift forks 146. The articulation actuators 148 may be positioned to rotate the lift forks 146 relative to the lift arms 142 about a horizontal axis. Accordingly, the articulation actuators 148 may assist in tipping refuse out of the refuse container and into the refuse compartment 130. The lift arm actuators 144 may then rotate the lift arms 142 to return the empty refuse container to the ground.

B. Side-Loading Refuse Vehicle

Figure 5:
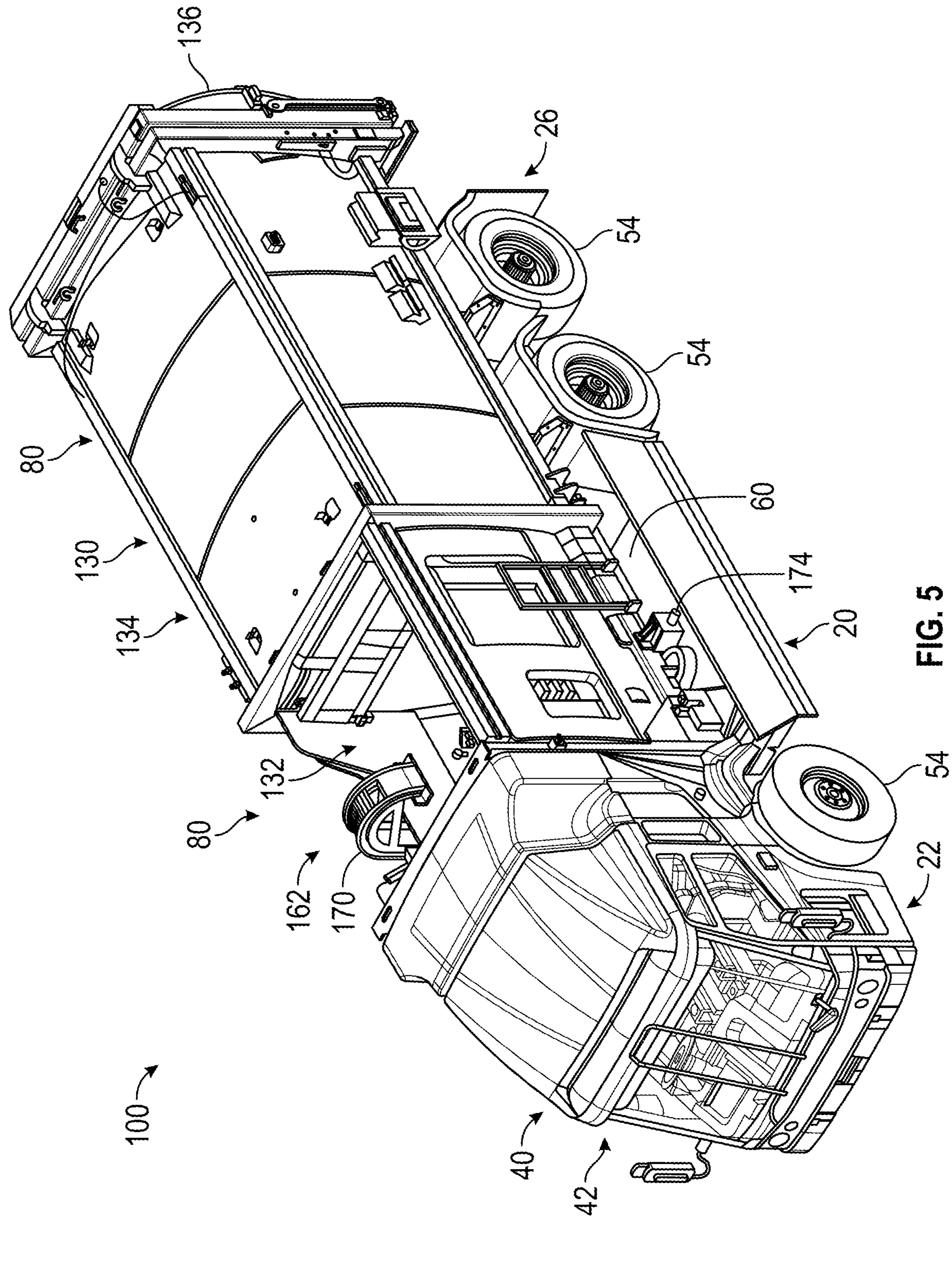
FIG. 5 is a perspective view of the vehicle of FIG. 1 configured as a side-loading refuse vehicle, according to an exemplary embodiment.
Figure 6:
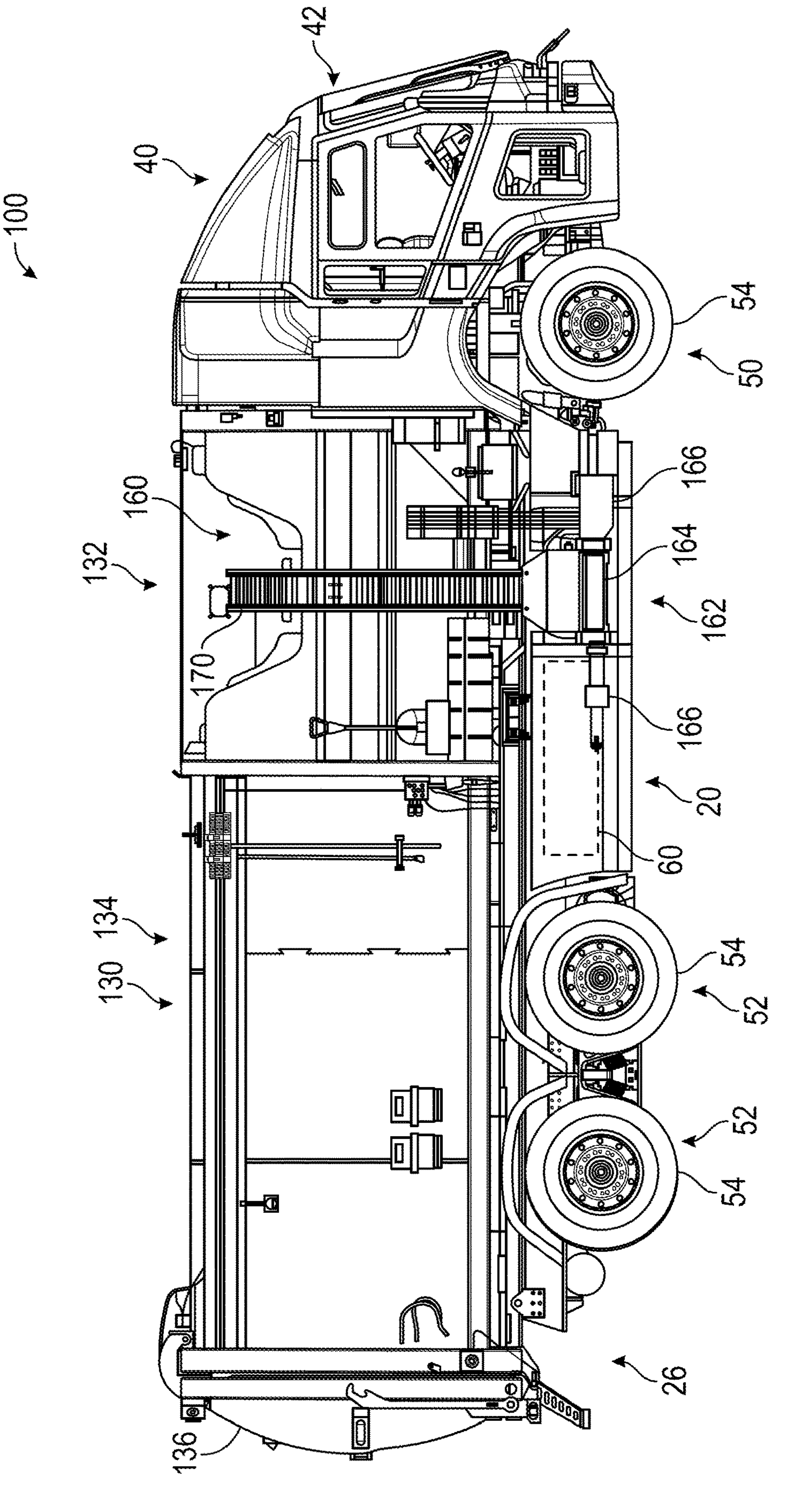
FIG. 6 is a right side view of the side-loading refuse vehicle of FIG. 5.
Figure 7:
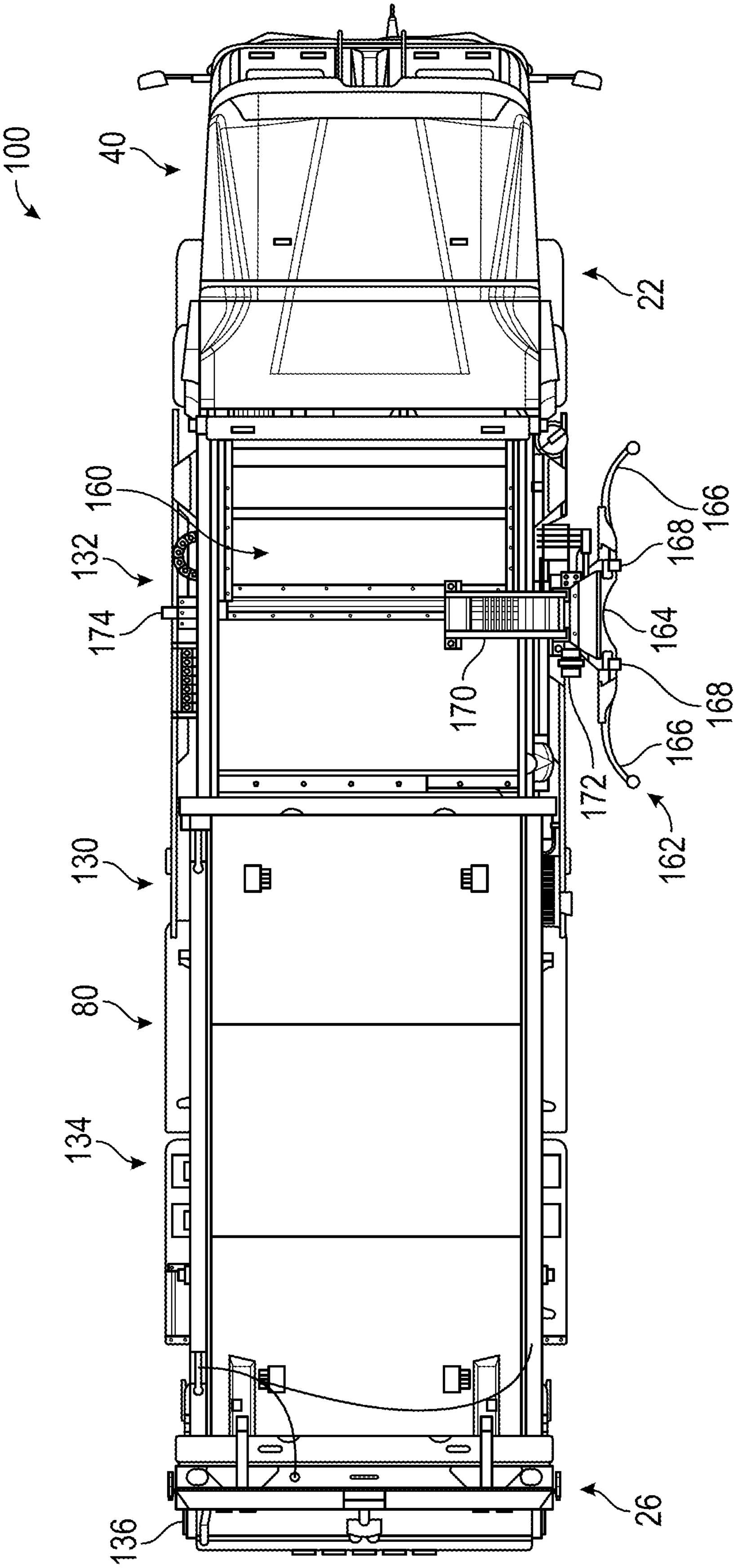
FIG. 7 is a top view of the side-loading refuse vehicle of FIG. 5.
Figure 8:
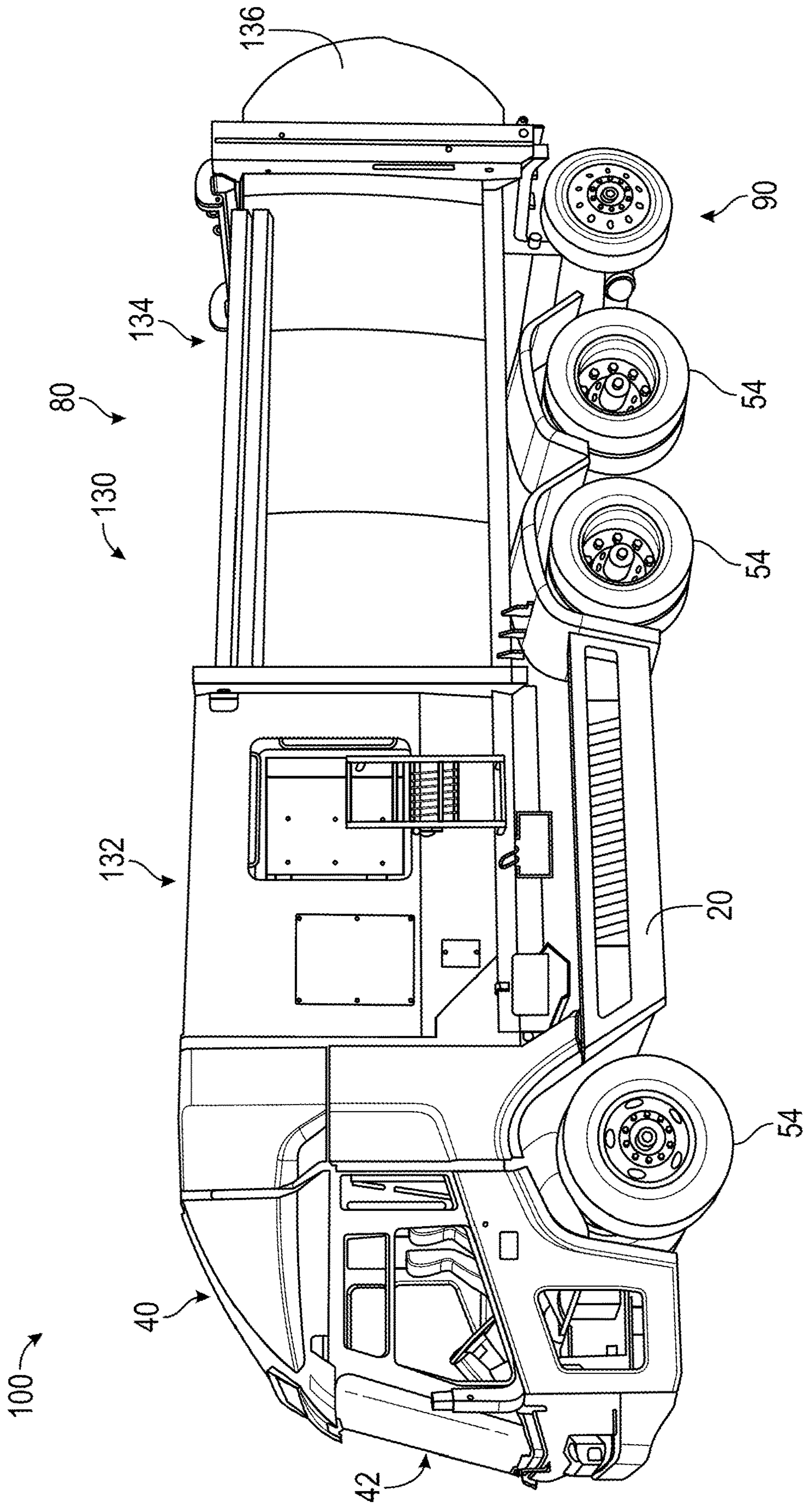
FIG. 8 is a left side view of the side-loading refuse vehicle of FIG. 5 configured with a tag axle.

Referring now to FIGS. 5-8, an alternative configuration of the refuse vehicle 100 is shown according to an exemplary embodiment. Specifically, the refuse vehicle 100 of FIGS. 5-8 is configured as a side-loading refuse vehicle. The refuse vehicle 100 of FIGS. 5-8 may be substantially similar to the front-loading refuse vehicle 100 of FIGS. 3 and 4 except as otherwise specified herein. As shown, the refuse vehicle 100 of FIGS. 5-7 is configured with a tag axle 90 in FIG. 8.

Referring still to FIGS. 5-8, the refuse vehicle 100 omits the lift assembly 140 and instead includes a side-loading lift assembly, shown as lift assembly 160, that extends laterally outward from a side of the refuse vehicle 100. The lift assembly 160 includes an interface assembly, shown as grabber assembly 162, that is configured to engage a refuse container (e.g., a residential garbage can) to selectively couple the refuse container to the lift assembly 160. The grabber assembly 162 includes a main portion, shown as main body 164, and a pair of fingers or interface members, shown as grabber fingers 166. The grabber fingers 166 are pivotally coupled to the main body 164 such that the grabber fingers 166 are each rotatable about a vertical axis. A pair of actuators (e.g., hydraulic motors, electric motors, etc.), shown as finger actuators 168, are configured to control movement of the grabber fingers 166 relative to the main body 164.

The grabber assembly 162 is movably coupled to a guide, shown as track 170, that extends vertically along a side of the refuse vehicle 100. Specifically, the main body 164 is slidably coupled to the track 170 such that the main body 164 is repositionable along a length of the track 170. An actuator (e.g., a hydraulic motor, an electric motor, etc.), shown as lift actuator 172, is configured to control movement of the grabber assembly 162 along the length of the track 170. In some embodiments, a bottom end portion of the track 170 is straight and substantially vertical such that the grabber assembly 162 raises or lowers a refuse container when moving along the bottom end portion of the track 170. In some embodiments, a top end portion of the track 170 is curved such that the grabber assembly 162 inverts a refuse container to dump refuse into the hopper volume 132 when moving along the top end portion of the track 170.

The lift assembly 160 further includes an actuator (e.g., a hydraulic cylinder, an electric linear actuator, etc.), shown as track actuator 174, that is configured to control lateral movement of the grabber assembly 162. By way of example, the track actuator 174 may be coupled to the chassis 20 and the track 170 such that the track actuator 174 moves the track 170 and the grabber assembly 162 laterally relative to the chassis 20. The track actuator 174 may facilitate repositioning the grabber assembly 162 to pick up and replace refuse containers that are spaced laterally outward from the refuse vehicle 100.

C. Concrete Mixer Truck

Figure 9:
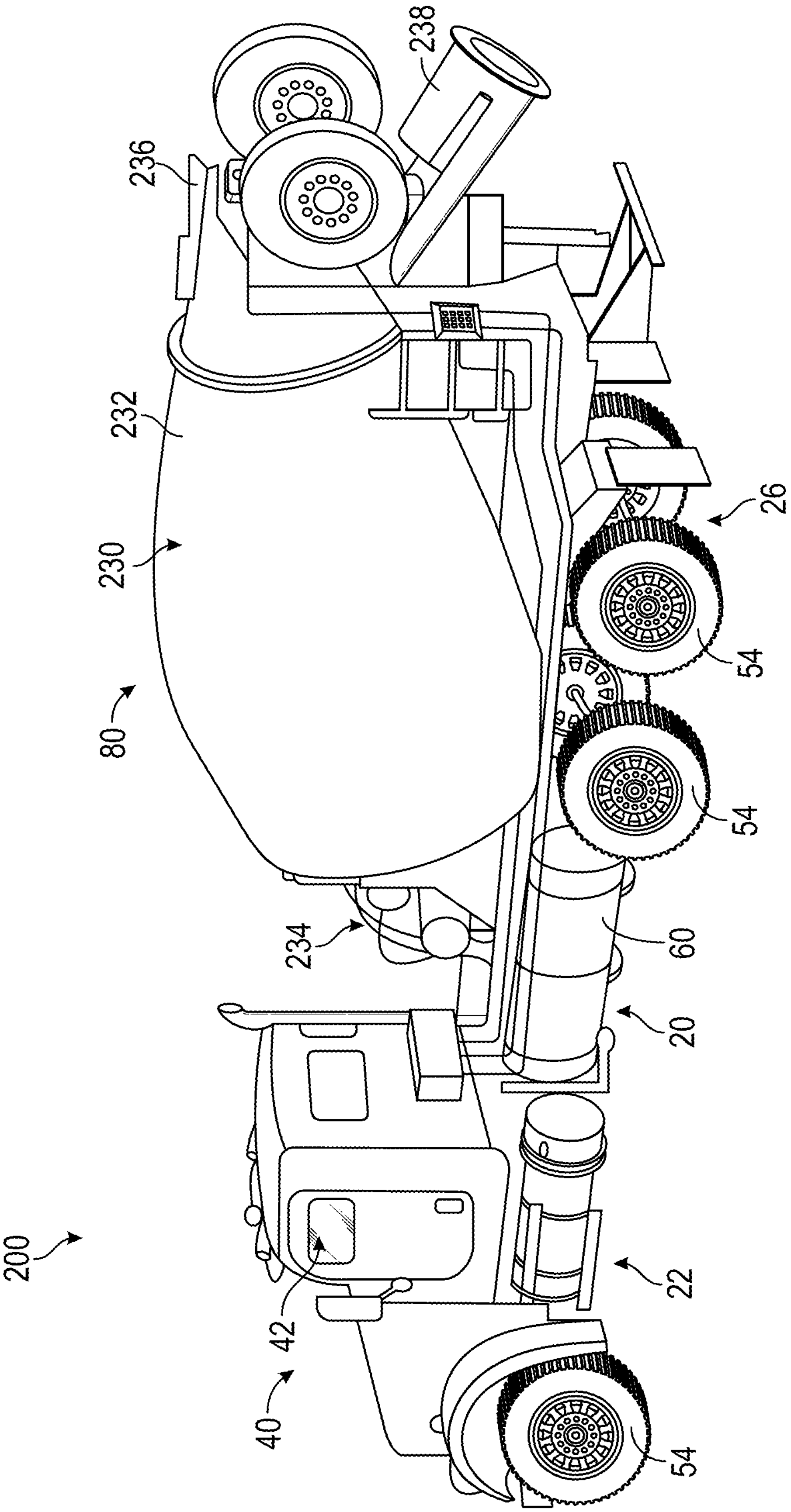
FIG. 9 is a perspective view of the vehicle of FIG. 1 configured as a mixer vehicle, according to an exemplary embodiment.

Referring now to FIG. 9, the vehicle 10 is configured as a mixer truck (e.g., a concrete mixer truck, a mixer vehicle, etc.), shown as mixer truck 200. Specifically, the mixer truck 200 is shown as a rear-discharge concrete mixer truck. In other embodiments, the mixer truck 200 is a front-discharge concrete mixer truck.

As shown in FIG. 9, the application kit 80 includes a mixing drum assembly (e.g., a concrete mixing drum), shown as drum assembly 230. The drum assembly 230 may include a mixing drum 232, a drum drive system 234 (e.g., a rotational actuator or motor, such as an electric motor or hydraulic motor), an inlet portion, shown as hopper 236, and an outlet portion, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 may be elevated from the chassis 20 (e.g., from a horizontal plane extending along the chassis 20) at an angle in the range of five degrees to twenty degrees. In other embodiments, the central, longitudinal axis may be elevated by less than five degrees (e.g., four degrees, etc.). In yet another embodiment, the mixer truck 200 may include an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves) including an injection valve that selectively fluidly couples a supply of fluid to the inner volume of the mixing drum 232. By way of example, the injection system may be used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) may be positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 may also include an actuator positioned such that the chute 238 may be selectively pivotable to position the chute 238 (e.g., vertically, laterally, etc.), for example at an angle at which the mixture is expelled from the mixing drum 232.

D. Fire Truck

Figure 10:
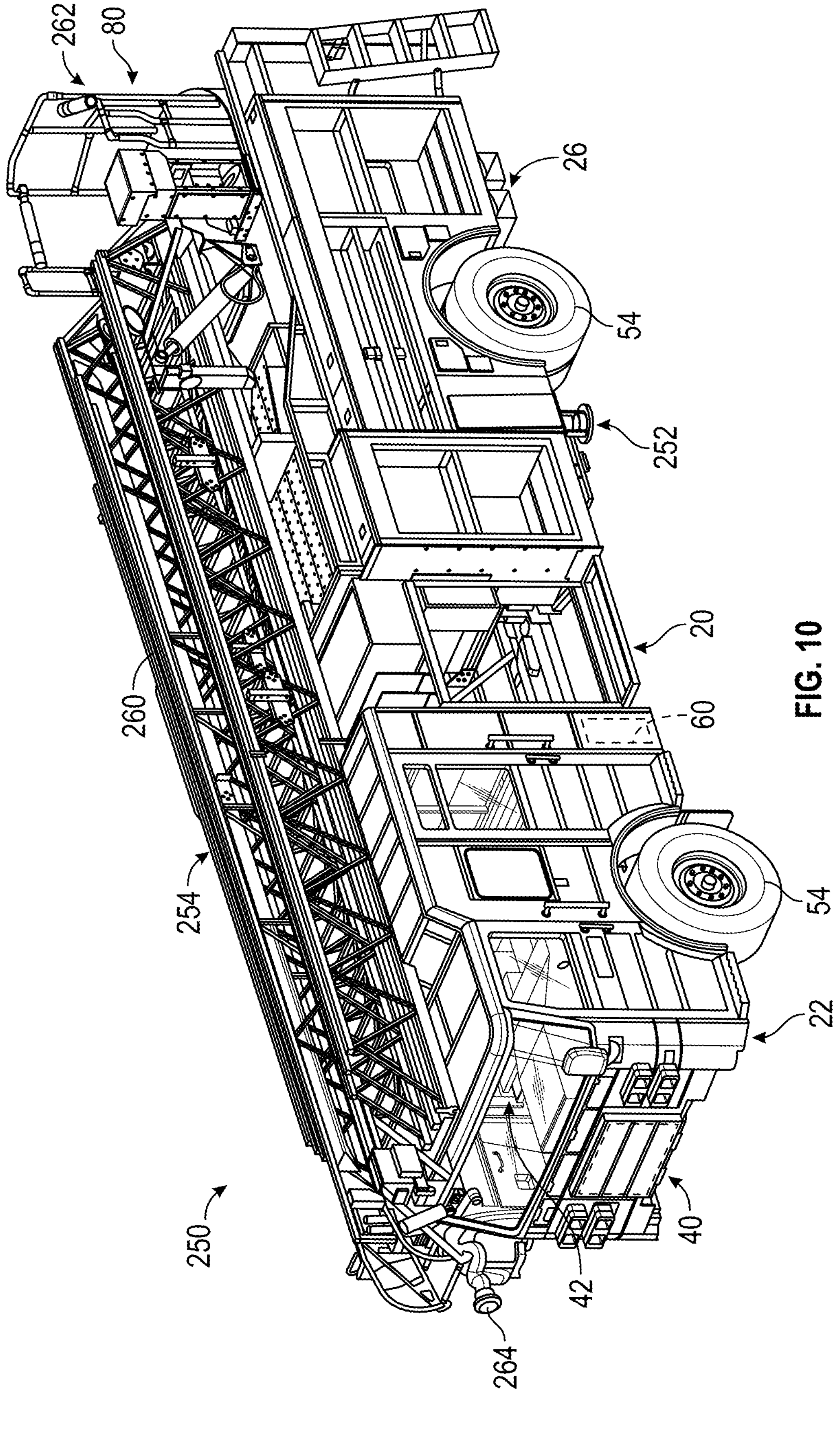
FIG. 10 is a perspective view of the vehicle of FIG. 1 configured as a fire fighting vehicle, according to an exemplary embodiment.

Referring now to FIG. 10, the vehicle 10 is configured as a fire fighting vehicle, fire truck, or fire apparatus (e.g., a turntable ladder truck, a pumper truck, a quint, etc.), shown as fire fighting vehicle 250. In the embodiment shown in FIG. 10, the fire fighting vehicle 250 is configured as a rear-mount aerial ladder truck. In other embodiments, the fire fighting vehicle 250 is configured as a mid-mount aerial ladder truck, a quint fire truck (e.g., including an onboard water storage, a hose storage, a water pump, etc.), a tiller fire truck, a pumper truck (e.g., without an aerial ladder), or another type of response vehicle. By way of example, the vehicle 10 may be configured as a police vehicle, an ambulance, a tow truck, or still other vehicles used for responding to a scene (e.g., an accident, a fire, an incident, etc.).

As shown in FIG. 10, in the fire fighting vehicle 250, the application kit 80 is positioned mainly rearward from the cab 40. The application kit 80 includes deployable stabilizers (e.g., outriggers, downriggers, etc.), shown as outriggers 252, that are coupled to the chassis 20. The outriggers 252 may be configured to selectively extend from each lateral side and/or the rear of the fire fighting vehicle 250 and engage a support surface (e.g., the ground) in order to provide increased stability while the fire fighting vehicle 250 is stationary. The fire fighting vehicle 250 further includes an extendable or telescoping ladder assembly, shown as ladder assembly 254. The increased stability provided by the outriggers 252 is desirable when the ladder assembly 254 is in use (e.g., extended from the fire fighting vehicle 250) to prevent tipping. In some embodiments, the application kit 80 further includes various storage compartments (e.g., cabinets, lockers, etc.) that may be selectively opened and/or accessed for storage and/or component inspection, maintenance, and/or replacement.

As shown in FIG. 10, the ladder assembly 254 includes a series of ladder sections 260 that are slidably coupled with one another such that the ladder sections 260 may extend and/or retract (e.g., telescope) relative to one another to selectively vary a length of the ladder assembly 254. A base platform, shown as turntable 262, is rotatably coupled to the chassis 20 and to a proximal end of a base ladder section 260 (i.e., the most proximal of the ladder sections 260). The turntable 262 may be configured to rotate about a vertical axis relative to the chassis 20 to rotate the ladder sections 260 about the vertical axis (e.g., up to 360 degrees, etc.). The ladder sections 260 may rotate relative to the turntable 262 about a substantially horizontal axis to selectively raise and lower the ladder sections 260 relative to the chassis 20. As shown, a water turret or implement, shown as monitor 264, is coupled to a distal end of a fly ladder section 260 (i.e., the most distal of the ladder sections 260). The monitor 264 may be configured to expel water and/or a fire suppressing agent (e.g., foam, etc.) from a water storage tank and/or an agent tank onboard the fire fighting vehicle 250, and/or from an external source (e.g., a fire hydrant, a separate water/pumper truck, etc.). In some embodiments, the ladder assembly 254 further includes an aerial platform coupled to the distal end of the fly ladder section 260 and configured to support one or more operators.

E. ARFF Truck

Figure 11:
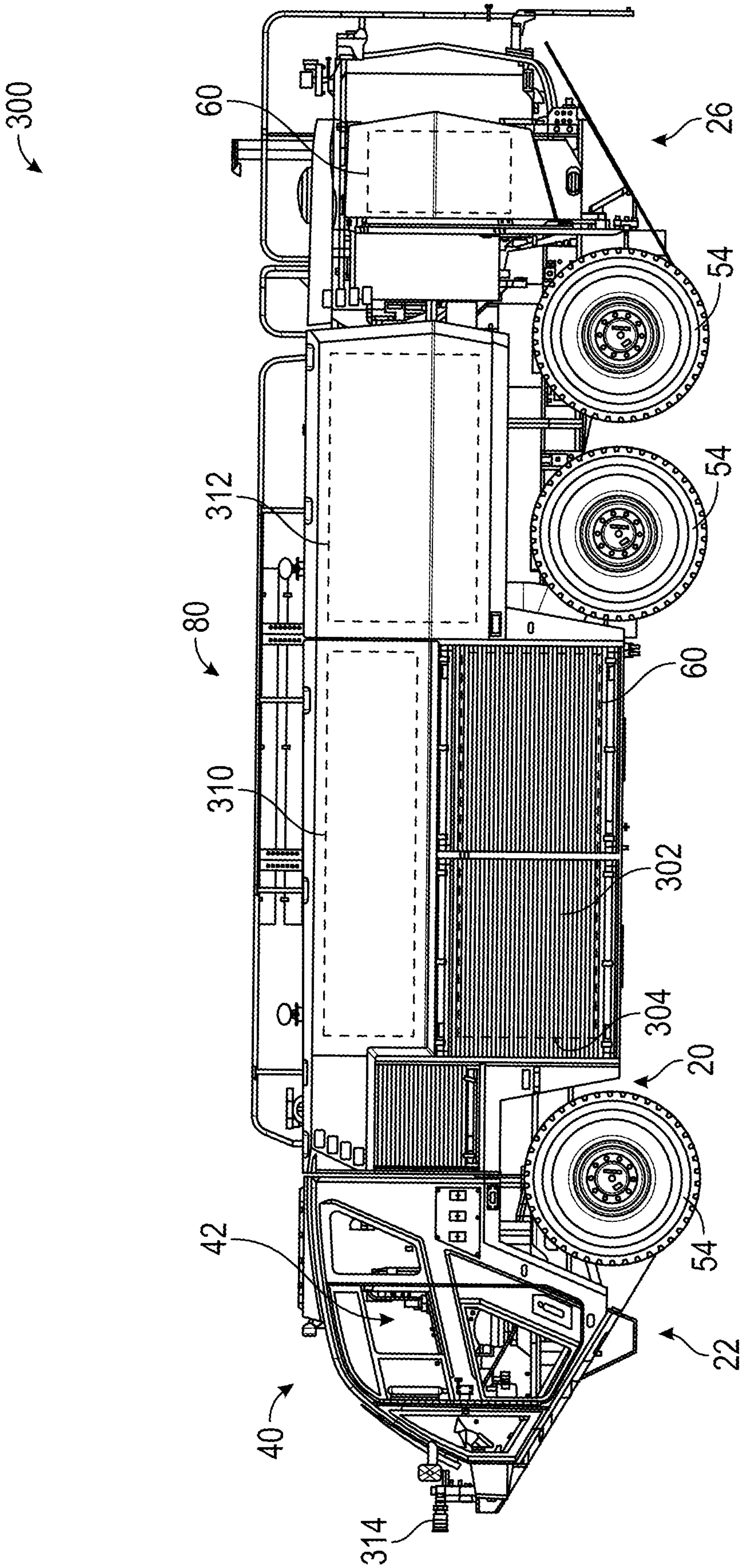
FIG. 11 is a left side view of the vehicle of FIG. 1 configured as an airport fire fighting vehicle, according to an exemplary embodiment.

Referring now to FIG. 11, the vehicle 10 is configured as a fire fighting vehicle, shown as airport rescue and fire fighting (ARFF) truck 300. As shown in FIG. 11, the application kit 80 is positioned primarily rearward of the cab 40. As shown, the application kit 80 includes a series of storage compartments or cabinets, shown as compartments

302, that are coupled to the chassis 20. The compartments 302 may store various equipment or components of the ARFF truck 300.

The application kit 80 includes a pump system 304 (e.g., an ultra-high-pressure pump system, etc.) positioned within one of the compartments 302 near the center of the ARFF truck 300. The application kit 80 further includes a water tank 310, an agent tank 312, and an implement or water turret, shown as monitor 314. The pump system 304 may include a high pressure pump and/or a low pressure pump, which may be fluidly coupled to the water tank 310 and/or the agent tank 312. The pump system 304 may to pump water and/or fire suppressing agent from the water tank 310 and the agent tank 312, respectively, to the monitor 314. The monitor 314 may be selectively reoriented by an operator to adjust a direction of a stream of water and/or agent. As shown in FIG. 11, the monitor 314 is coupled to a front end of the cab 40.

F. Boom Lift

Figure 12:
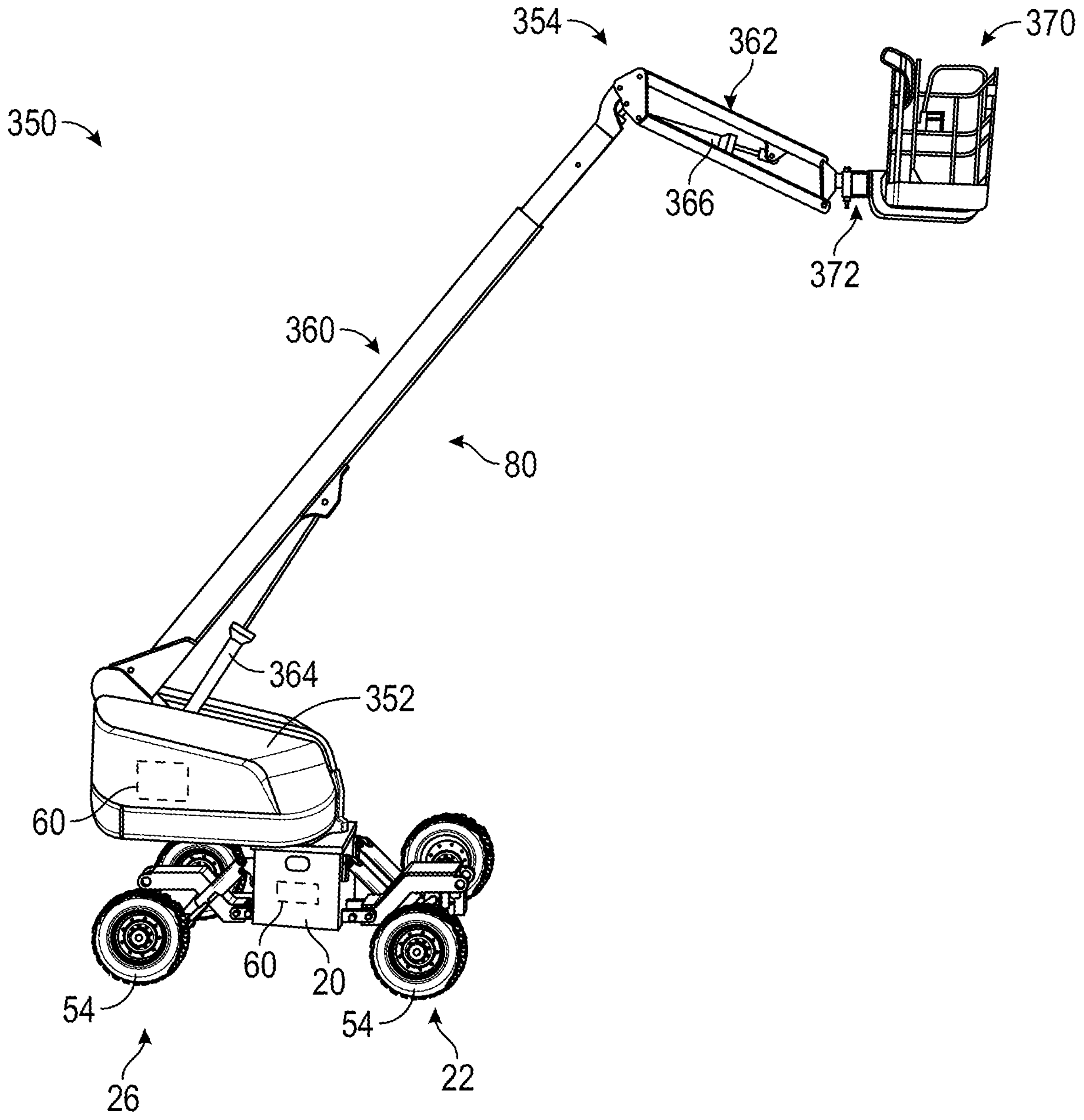
FIG. 12 is a perspective view of the vehicle of FIG. 1 configured as a boom lift, according to an exemplary embodiment.

Referring now to FIG. 12, the vehicle 10 is configured as a lift device, shown as boom lift 350. The boom lift 350 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 12, the application kit 80 includes a base assembly, shown as turntable 352, that is rotatably coupled to the chassis 20. The turntable 352 may be configured to selectively rotate relative to the chassis 20 about a substantially vertical axis. In some embodiments, the turntable 352 includes a counterweight (e.g., the batteries) positioned near the rear of the turntable 352. The turntable 352 is rotatably coupled to a lift assembly, shown as boom assembly 354. The boom assembly 354 includes a first section or telescoping boom section, shown as lower boom 360. The lower boom 360 includes a series of nested boom sections that extend and retract (e.g., telescope) relative to one another to vary a length of the boom assembly 354. The boom assembly 354 further includes a second boom section or four bar linkage, shown as upper boom 362. The upper boom 362 may include structural members that rotate relative to one another to raise and lower a distal end of the boom assembly 354. In other embodiments, the boom assembly 354 includes more or fewer boom sections (e.g., one, three, five, etc.) and/or a different arrangement of boom sections.

As shown in FIG. 12, the boom assembly 354 includes a first actuator, shown as lower lift cylinder 364. The lower boom 360 is pivotally coupled (e.g., pinned, etc.) to the turntable 352 at a joint or lower boom pivot point. The lower lift cylinder 364 (e.g., a pneumatic cylinder, an electric linear actuator, a hydraulic cylinder, etc.) is coupled to the turntable 352 at a first end and coupled to the lower boom 360 at a second end. The lower lift cylinder 364 may be configured to raise and lower the lower boom 360 relative to the turntable 352 about the lower boom pivot point.

The boom assembly 354 further includes a second actuator, shown as upper lift cylinder 366. The upper boom 362 is pivotally coupled (e.g., pinned) to the upper end of the lower boom 360 at a joint or upper boom pivot point. The upper lift cylinder 366 (e.g., a pneumatic cylinder, an electric linear actuator, a hydraulic cylinder, etc.) is coupled to the upper boom 362. The upper lift cylinder 366 may be configured to extend and retract to actuate (e.g., lift, rotate, elevate, etc.) the upper boom 362, thereby raising and lowering a distal end of the upper boom 362.

Referring still to FIG. 12, the application kit 80 further includes an operator platform, shown as platform assembly 370, coupled to the distal end of the upper boom 362 by an extension arm, shown as jib arm 372. The jib arm 372 may be configured to pivot the platform assembly 370 about a lateral axis (e.g., to move the platform assembly 370 up and down, etc.) and/or about a vertical axis (e.g., to move the platform assembly 370 left and right, etc.).

The platform assembly 370 provides a platform configured to support one or more operators or users. In some embodiments, the platform assembly 370 may include accessories or tools configured for use by the operators. For example, the platform assembly 370 may include pneumatic tools (e.g., an impact wrench, airbrush, nail gun, ratchet, etc.), plasma cutters, welders, spotlights, etc. In some embodiments, the platform assembly 370 includes a control panel (e.g., a user interface, a removable or detachable control panel, etc.) configured to control operation of the boom lift 350 (e.g., the turntable 352, the boom assembly 354, etc.) from the platform assembly 370 or remotely. In other embodiments, the platform assembly 370 is omitted, and the boom lift 350 includes an accessory and/or tool (e.g., forklift forks, etc.) coupled to the distal end of the boom assembly 354.

G. Scissor Lift

Figure 13:
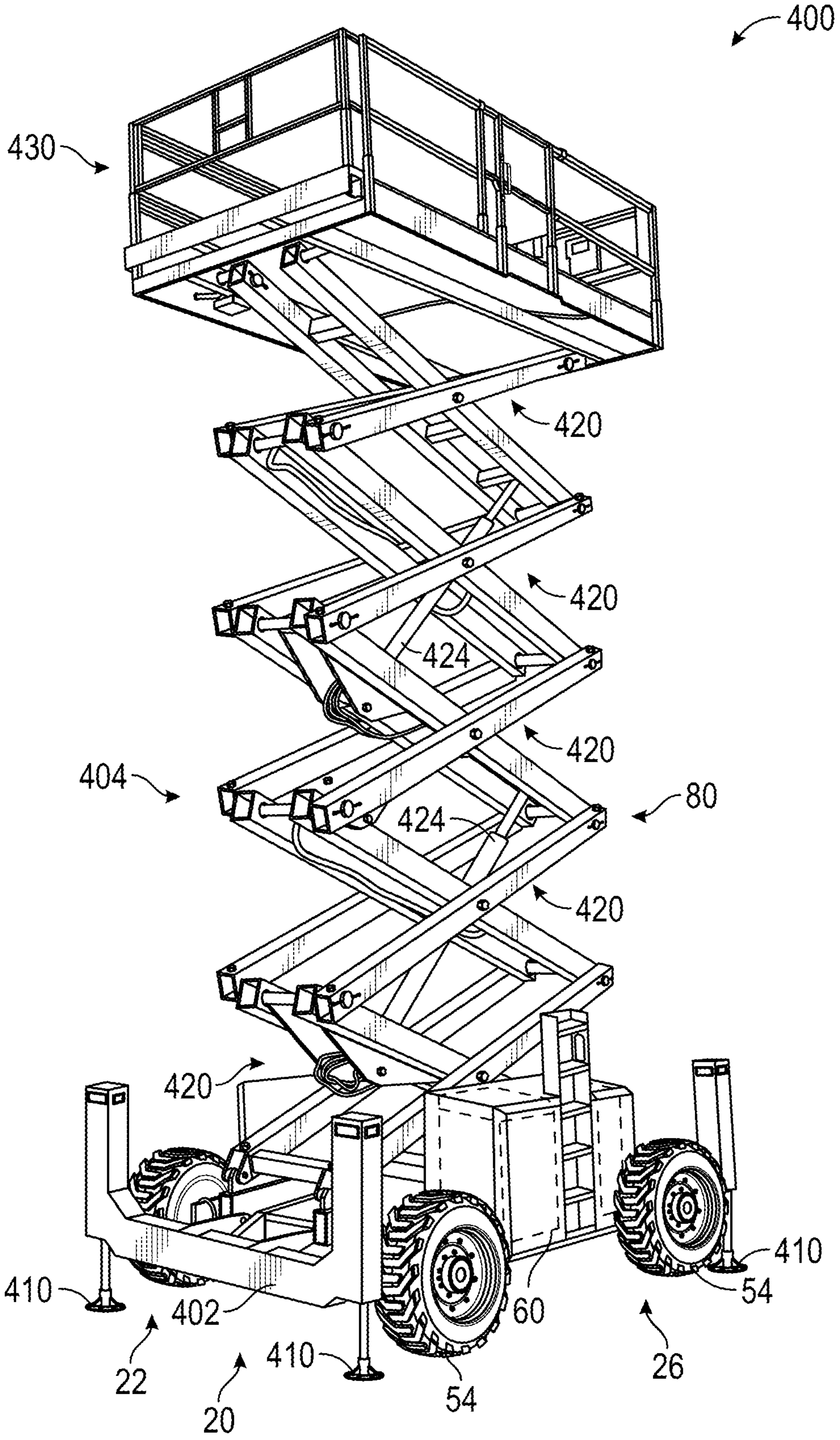
FIG. 13 is a perspective view of the vehicle of FIG. 1 configured as a scissor lift, according to an exemplary embodiment.

Referring now to FIG. 13, the vehicle 10 is configured as a lift device, shown as scissor lift 400. As shown in FIG. 13, the application kit 80 includes a body, shown as lift base 402, coupled to the chassis 20. The lift base 402 is coupled to a scissor assembly, shown as lift assembly 404, such that the lift base 402 supports the lift assembly 404. The lift assembly 404 is configured to extend and retract, raising and lowering between a raised position and a lowered position relative to the lift base 402.

As shown in FIG. 13, the lift base 402 includes a series of actuators, stabilizers, downriggers, or outriggers, shown as leveling actuators 410. The leveling actuators 410 may extend and retract vertically between a stored position and a deployed position. In the stored position, the leveling actuators 410 may be raised, such that the leveling actuators 410 do not contact the ground. Conversely, in the deployed position, the leveling actuators 410 may engage the ground to lift the lift base 402. The length of each of the leveling actuators 410 in their respective deployed positions may be varied in order to adjust the pitch (e.g., rotational position about a lateral axis) and the roll (e.g., rotational position about a longitudinal axis) of the lift base 402 and/or the chassis 20. Accordingly, the lengths of the leveling actuators 410 in their respective deployed positions may be adjusted to level the lift base 402 with respect to the direction of gravity (e.g., on uneven, sloped, pitted, etc. terrain). The leveling actuators 410 may lift the wheel and tire assemblies 54 off of the ground to prevent movement of the scissor lift 400 during operation. In other embodiments, the leveling actuators 410 are omitted.

The lift assembly 404 may include a series of subassemblies, shown as scissor layers 420, each including a pair of inner members and a pair of outer members pivotally coupled to one another. The scissor layers 420 may be stacked atop one another in order to form the lift assembly 404, such that movement of one scissor layer 420 causes a similar movement in all of the other scissor layers 420. The scissor layers 420 extend between and couple the lift base 402 and an operator platform (e.g., the platform assembly 430). In some embodiments, scissor layers 420 may be added to, or removed from, the lift assembly 404 in order to increase, or decrease, the fully extended height of the lift assembly 404.

Referring still to FIG. 13, the lift assembly 404 may also include one or more lift actuators 424 (e.g., hydraulic cylinders, pneumatic cylinders, electric linear actuators such as motor-driven leadscrews, etc.) configured to extend and retract the lift assembly 404. The lift actuators 424 may be pivotally coupled to inner members of various scissor layers 420, or otherwise arranged within the lift assembly 404.

A distal or upper end of the lift assembly 404 is coupled to an operator platform, shown as platform assembly 430. The platform assembly 430 may perform similar functions to the platform assembly 370, such as supporting one or more operators, accessories, and/or tools. The platform assembly 430 may include a control panel to control operation of the scissor lift 400. The lift actuators 424 may be configured to actuate the lift assembly 404 to selectively reposition the platform assembly 430 between a lowered position (e.g., where the platform assembly 430 is proximate to the lift base 402) and a raised position (e.g., where the platform assembly 430 is at an elevated height relative to the lift base 402). Specifically, in some embodiments, extension of the lift actuators 424 moves the platform assembly 430 upward (e.g., extending the lift assembly 404), and retraction of the lift actuators 424 moves the platform assembly 430 downward (e.g., retracting the lift assembly 404). In other embodiments, extension of the lift actuators 424 retracts the lift assembly 404, and retraction of the lift actuators 424 extends the lift assembly 404.

Refuse Vehicle with an Automatically Ejecting Pack Panel

In general, the refuse vehicles 100 illustrated in FIGS. 3-8 can be equipped with an ejection input (e.g., a button, a switch, a joystick, a soft key on a display, etc.) that is configured to automatically initiate an ejection procedure where refuse is ejected from the refuse compartment. The ejection procedure gradually extends a pack panel toward an extended position and activation of the ejection input automatically extends the pack panel sequentially to a plurality of extended positions. That is, the extended positions traversed during the ejection procedure are predefined and activation of the ejection input removes the need for a user of the refuse vehicle 100 to manually control the number and location of extension positions traversed during the ejection procedure.

Figure 14:
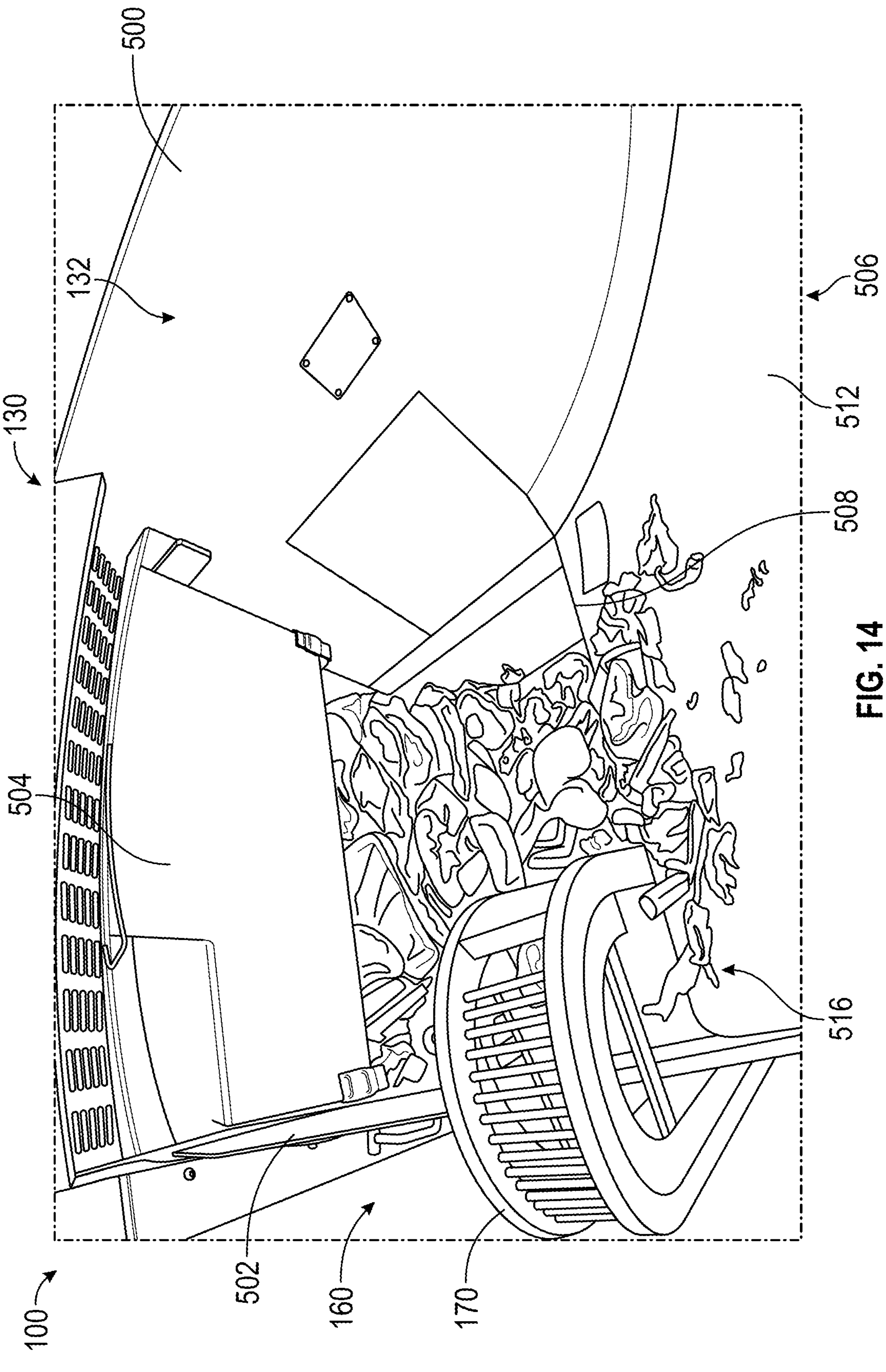
FIG. 14 is a perspective view of a refuse compartment and hopper volume of the side-loading refuse vehicle of FIG. 5, according to an exemplary embodiment.
Figure 15:
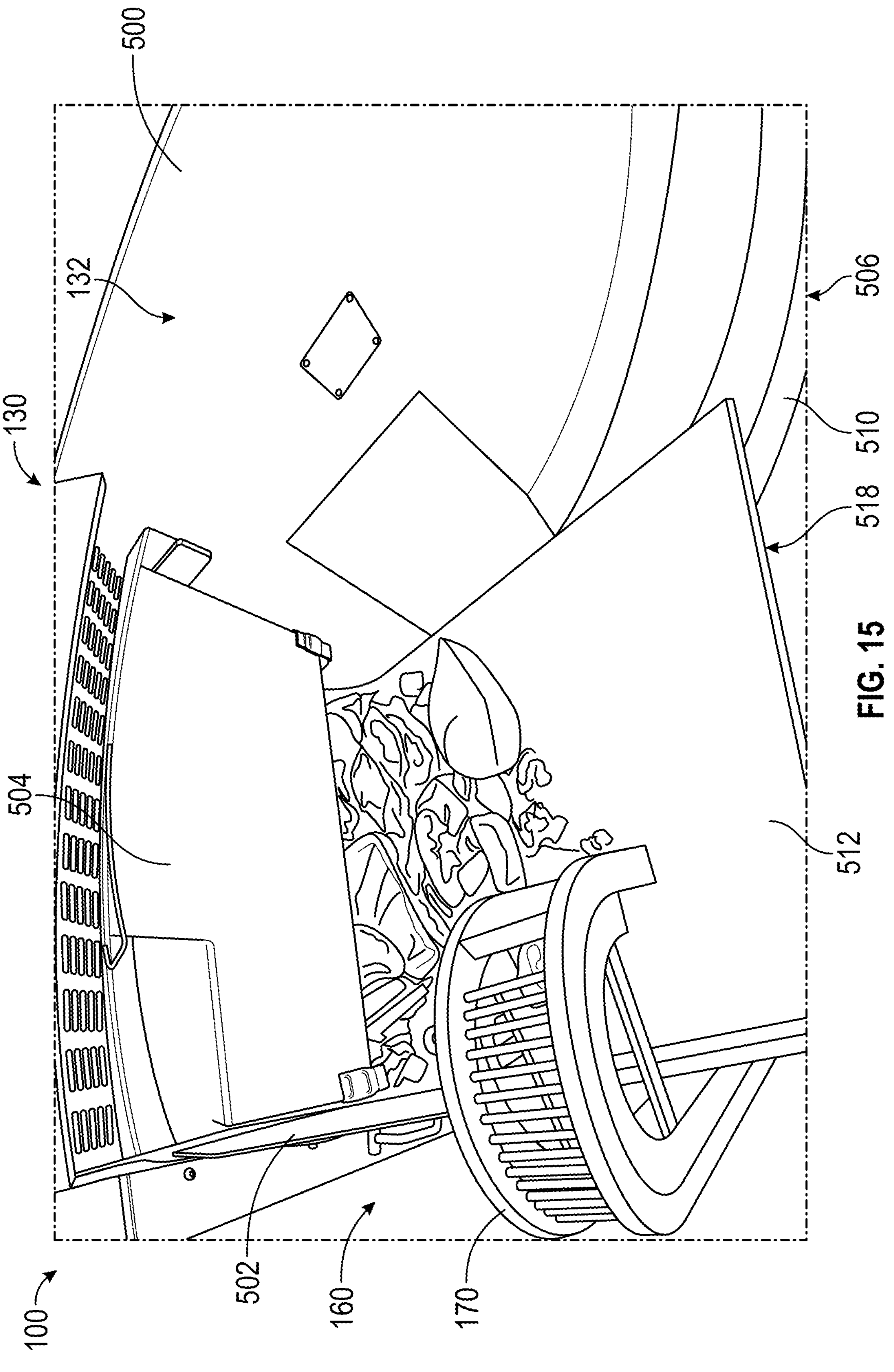
FIG. 15 is a perspective view of the refuse compartment and the hopper volume of FIG. 14 with a pack panel at least partially extended, according to an exemplary embodiment.
Figure 16:
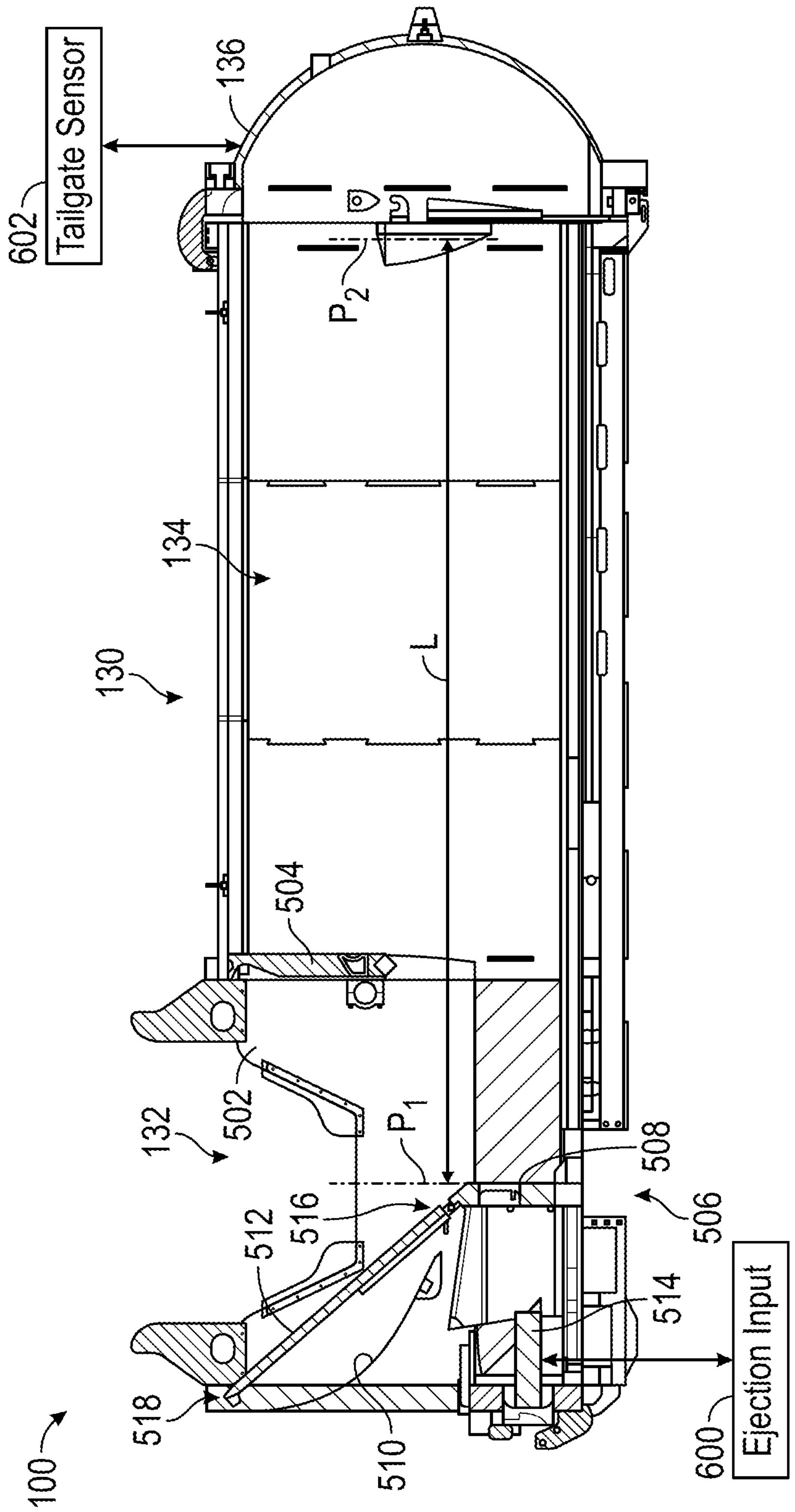
FIG. 16 is a cross-sectional view of a refuse compartment and a packing assembly of the side-loading vehicle of FIG. 5, with a pack panel in a retracted position, according to an exemplary embodiment.

FIGS. 14 and 15 illustrate an exemplary embodiment of the refuse compartment 130 of the side-loading refuse vehicle 100. As shown in FIGS. 14 and 15, the hopper volume 132 is an internal volume of the refuse compartment 130 and is defined by a left sidewall 500, a right sidewall 502, a holding plate 504, and a packing assembly 506. The left sidewall 500 extends longitudinally (e.g., in a direction extending between the cab 40 and the tailgate 136) between the holding plate 504 and the packing assembly 506. The lifting assembly 160 is arranged on the right sidewall 502, and the holding plate 504 extends downwardly (e.g., in a direction toward the chassis 20, or in a direction perpendicular to the ground on which the vehicle 100 travels) from a top wall of the refuse compartment 130. In general, the holding plate 504 separates the hopper volume 132 and the storage volume 134 and forms a partition between the two sections in the refuse compartment 130. In addition, the holding plate 504 aids in preventing refuse being packed into the storage volume 134 from falling back toward the hopper volume 132.

With reference to FIGS. 14-19, the packing assembly 506 includes a pack panel 508, a ramped or curved wall 510, a pivot or follower plate 512, and a packing actuator 514. The pack panel 508 is arranged generally vertically (e.g., in a direction perpendicular to a road on which the vehicle 100 travels) and faces in a direction toward the storage volume 134 (e.g., a normal extending from the outer surface of the pack panel 508 is directed toward the storage volume 134). A first end 516 of the pivot plate 512 is rotatably coupled to a distal end of the pack panel 508 so that the pivot plate 512 rotates relative to the pack panel 508 as the pack panel 508 moves between retracted and extended positions. A second end 518 of the pivot plate 512 is configured to engage and slide along the curved wall 510 (e.g., when the pack panel 508 is in a position where the second end 518 of the pivot plate 512 overlaps with the curved wall 510). The curved wall 510 defines a generally curved profile that ramps downwardly in a direction toward the storage volume 134.

The pack panel 508 is coupled to the packing actuator 514 so that the packing actuator 514 selectively moves the pack panel 508 between a retracted or home position (see, e.g., FIGS. 14 and 16) and an extended or eject position (see, e.g., FIG. 18), between the extended position and the retracted position, and any position in between the extended position and the retracted position. In some embodiments, the packing actuator 514 is a telescoping actuator that is pneumatically, hydraulically, electronically, or electro-hydraulically driven.

Figure 17:
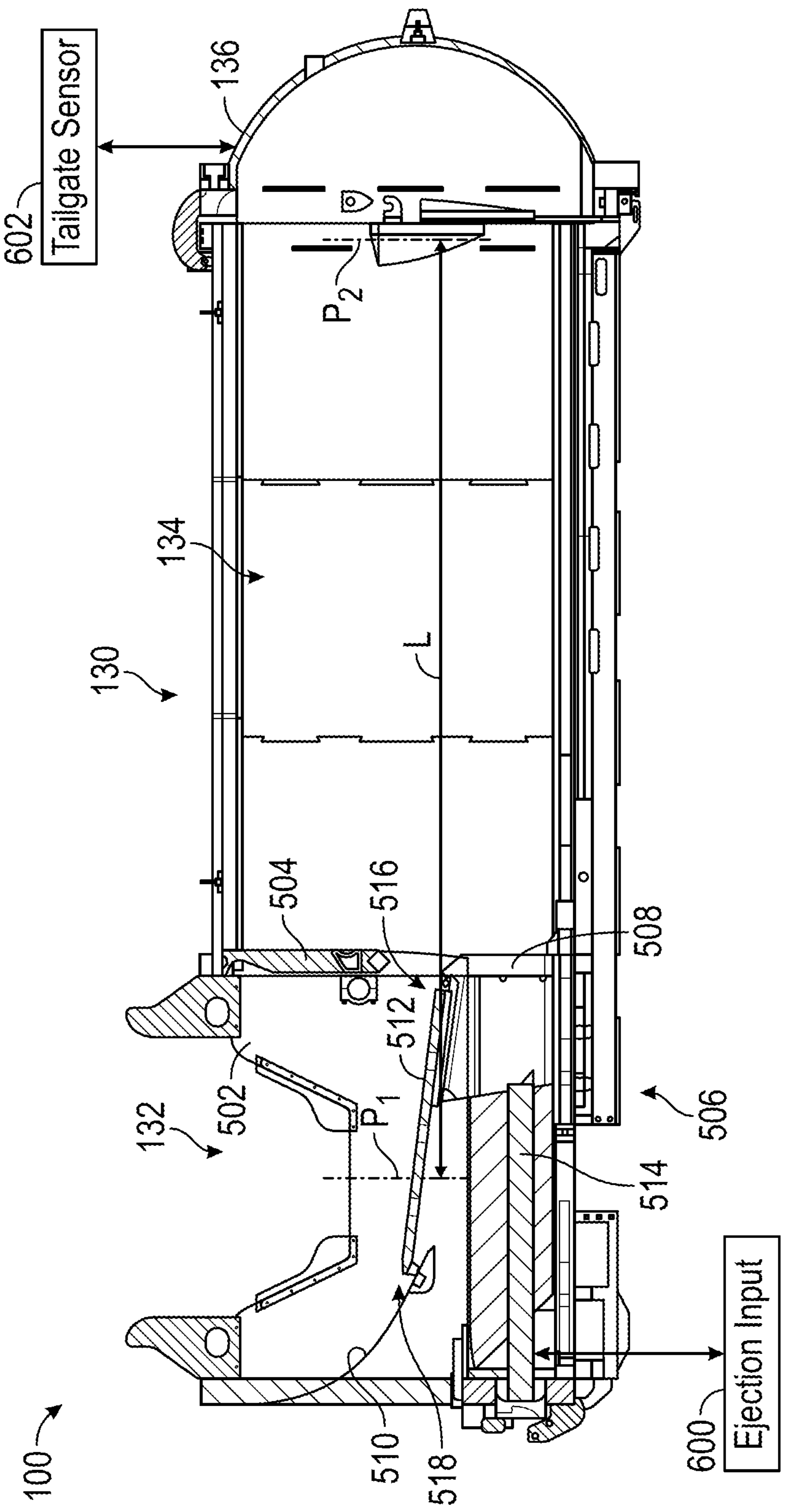
FIG. 17 is a cross-sectional view of a refuse compartment and a packing assembly of the side-loading vehicle of FIG. 5, with a pack panel extended between a retracted position and an extended position, according to an exemplary embodiment.

A packing procedure generally includes moving the pack panel 508 from the retracted position (see, e.g., FIGS. 14 and 16) to a position where the pack panel 508 is at least partially extended from the retracted position in a direction toward the extended position (see, e.g., FIGS. 15 and 17). In the retracted position, the pack panel 508 is arranged at least partially within the hopper volume 132, and the packing procedure extends the pack panel 508 toward the storage volume 134 to compact and displace refuse in the hopper volume 132 in a direction toward the storage volume 134. This enables the hopper volume 132 to be repeatedly filled and packed until the storage volume 134 is full and an ejection procedure is required.

Figure 18:
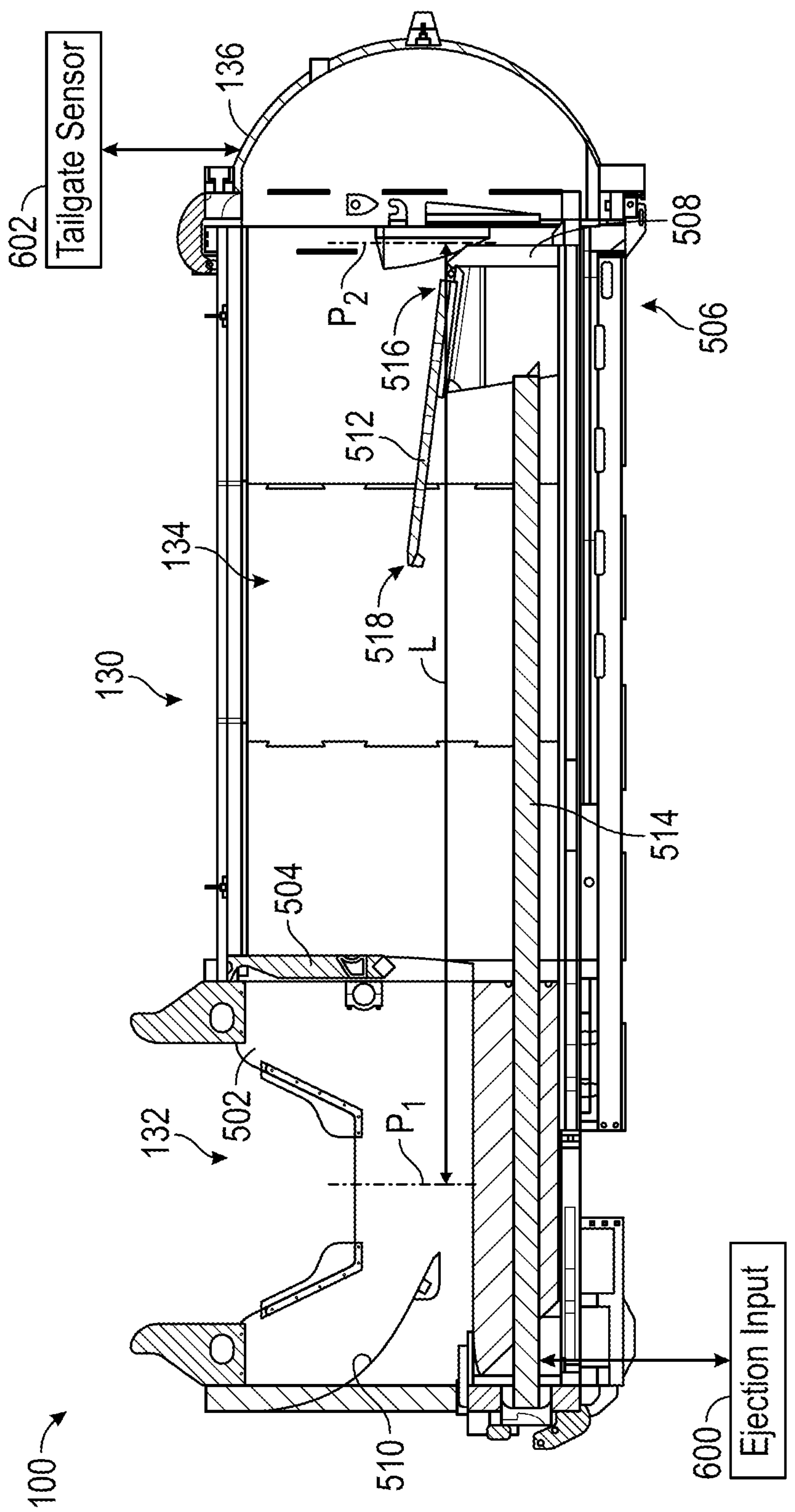
FIG. 18 is a cross-sectional view of a refuse compartment and a packing assembly of the side-loading vehicle of FIG. 5, with a pack panel in an extended position, according to an exemplary embodiment.

The ejection procedure generally includes moving the pack panel 508, via the packing actuator 514, to the extended or eject position (see, e.g., FIG. 18). As will be described herein, during the ejection procedure, the tailgate 136 is opened and the pack panel 508 is moved to the extended position and refuse in the storage volume 134 is ejected. The movement of the pack panel 508 between the retracted position and the extended position defines a travel length or distance of the pack panel 508. For example, in the retracted position, the pack panel 508 defines an initial plane $P_1$ and, in the extended position, the pack panel 508 defines a final plane $P_2$. A length L is defined between the initial plane $P_1$ and the final plane $P_2$ and represents a travel distance traversed by the pack panel 508 between the retracted and extended positions.

In the illustrated embodiment, the vehicle 100 includes an ejection input 600 and a tailgate sensor 602. In some embodiments, the ejection input 600 is arranged within the cab interior 42. In some embodiments, the ejection input 600 is in the form of a button, a switch, a joystick, a soft key on a display, or an equivalent input that is capable of being manually activated by a user of the vehicle 100. The ejection input 600 is configured to automatically initiate an ejection procedure in response to activation of the ejection input 600 (e.g., a user manually pressing the ejection input 600). The position of the pack panel 508 is automatically controlled and predefined during the ejection procedure, as described herein.

The tailgate sensor 602 is configured to detect a position of the tailgate 136 and provide an indication of whether the tailgate 136 is in the open position or the closed position. In some embodiments, the tailgate sensor 602 is in the form of a limit switch that is configured to detect the presence of the tailgate 136 is in the closed position. In some embodiments, the tailgate sensor 602 is in communication with the tailgate actuator 138 and is configured to detect a position of the tailgate 136 based on the tailgate actuator 138 (e.g., by detecting a position of a piston that extends from the tailgate actuator 138).

Figure 19:
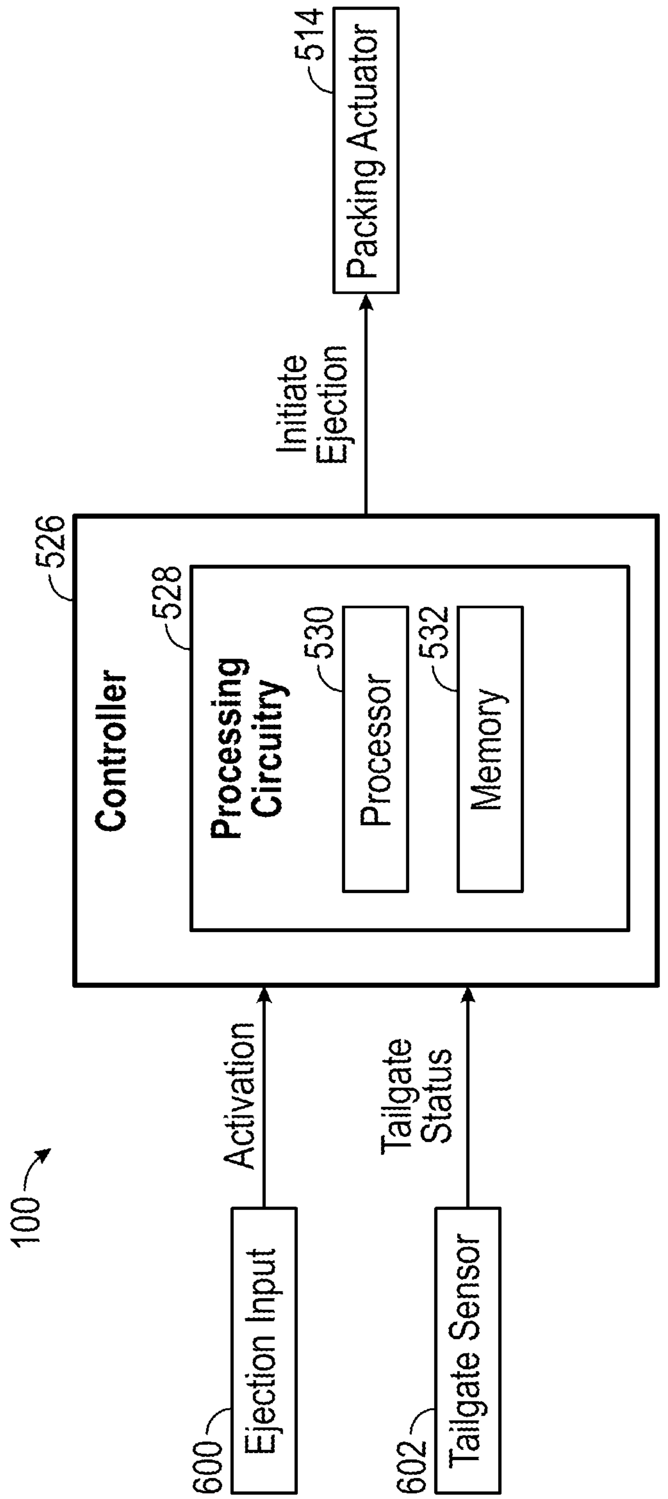
FIG. 19 is a block diagram of a controller of the side-loading refuse vehicle of FIG. 5, according to an exemplary embodiment.

As shown in FIG. 19, the vehicle 100 includes a controller 526 in communication with the ejection input 600, the tailgate sensor 602, and the packing actuator 514. In some embodiments, the controller 526 is a native controller on the vehicle 100 that communicates over a vehicle CAN bus. In some embodiments, the controller 526 is a dedicated controller that is included on the vehicle to control operations of the packing assembly 506, the ejection input 600, and the tailgate sensor 602. The controller 526 includes a processing circuit 528 having a processor 530 and memory 532. The processing circuit 528 can be communicably connected to a communications interface such that the processing circuit 528 and the various components thereof can send and receive data via the communications interface. The processor 530 can be implemented as a general purpose processor, an application specific integrated circuit ("ASIC"), one or more field programmable gate arrays ("FPGAs"), a group of processing components, or other suitable electronic processing components.

The memory 532 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 532 can be or include volatile memory or non-volatile memory. The memory 532 can include database components, object code components, script components, or any other type of information structure for supporting the various activities and information structures described in the present application. According to some embodiments, the memory 532 is communicably connected to the processor 530 via the processing circuit 528 and includes computer code for executing (e.g., by the processing circuit 528 and/or the processor 530) one or more processes described herein.

In general, the ejection input 600 is in communication with the controller 526 so that the controller 526 automatically instructs the packing actuator 514 to initiate an ejection procedure in response to activation of the ejection input 600. In some embodiments, after activation of the ejection input 600, the controller 526 initially verifies that the tailgate 136 is in the open position, via the tailgate sensor 602, prior to initiating the ejection procedure. If the tailgate sensor 602 indicates that the tailgate 136 is in the closed position, an indication is provided to a user of the vehicle (e.g., a light, a sound, and/or a message displayed on a display) that instructs the user to open the tailgate 136. If the tailgate sensor 602 indicates that the tailgate 136 is in the open position, the controller 526 instructs the packing actuator 514 to perform the ejection procedure.

In general, during the ejection procedure, the packing actuator 514 is configured to move the pack panel 508 to any position along the length L between the retracted position and the extended position, and the ejection procedure can include any number of extended positions between the retracted position and the extended position. In some embodiments, during the ejection procedure, the pack panel 508 is extended by the packing actuator 514 to a plurality of extended positions. In some embodiments, each of the plurality of extended positions is sequentially closer to the retracted position. In some embodiments, at least two of the plurality of extended positions are at the same extension distance. In some embodiments, the pack panel 508 is retracted back to the retracted position after reaching each of the extended positions, which maintains refuse in front of the pack panel 508 and causes refuse to fall off of the pack panel 508. In some embodiments, the pack panel 508 is retracted back to a previous extended position after each subsequent extension.

Figure 20:
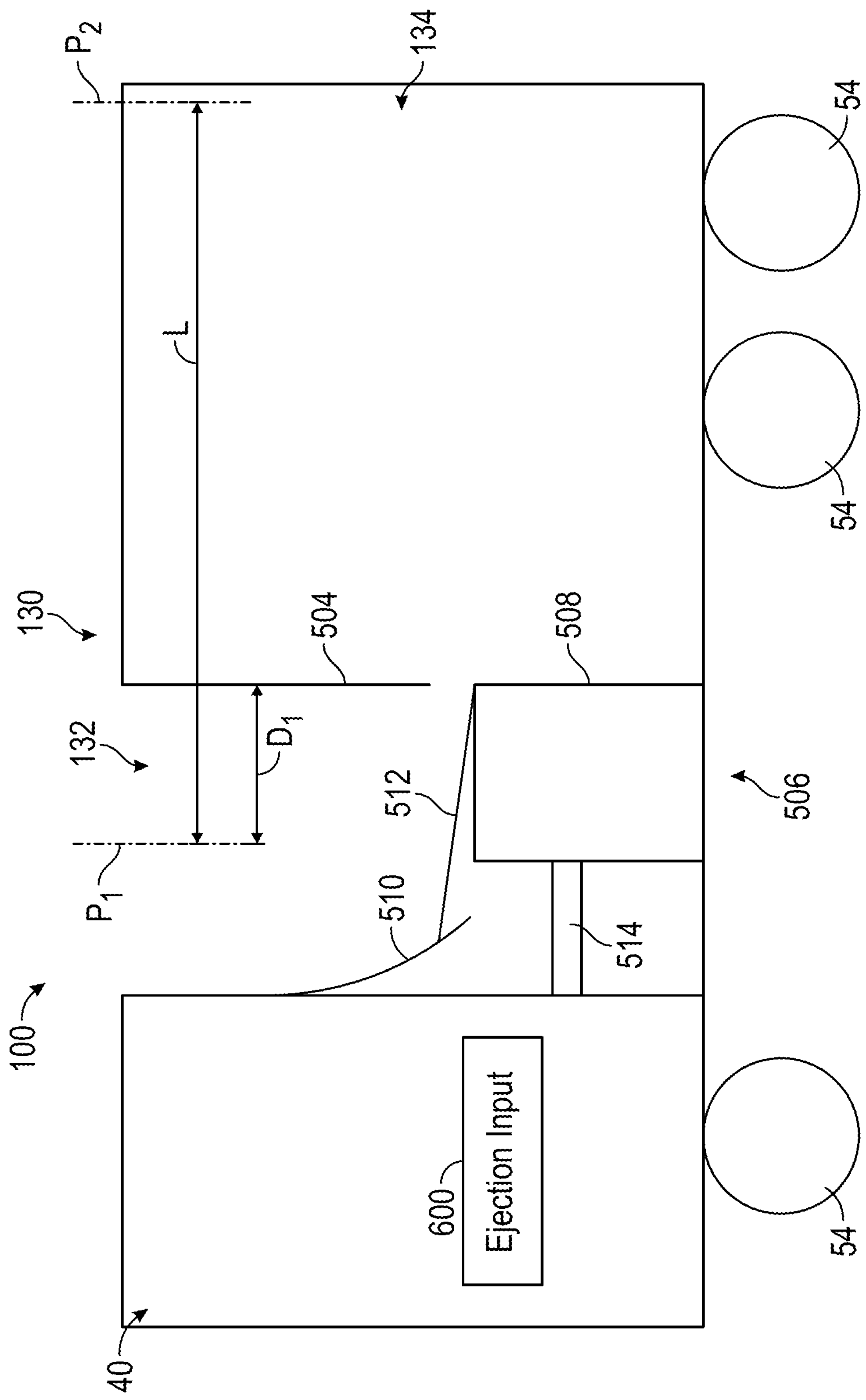
FIG. 20 is a schematic illustration of the side-loading refuse vehicle of FIG. 5 with a pack panel in a first position between a retracted position and an extended position, according to an exemplary embodiment.
Figure 21:
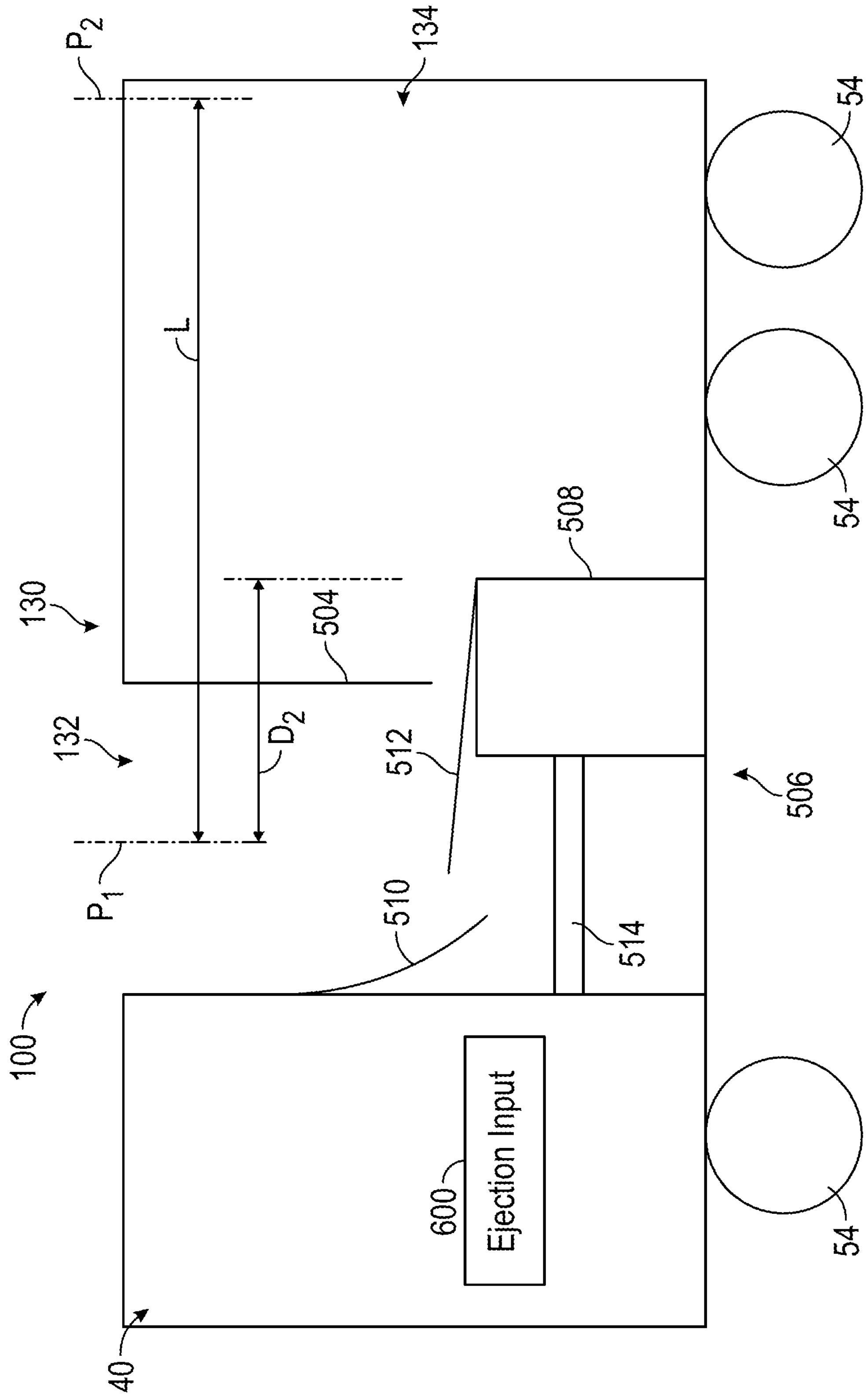
FIG. 21 is a schematic illustration of the side-loading refuse vehicle of FIG. 5 with a pack panel in a second position between a retracted position and an extended position, according to an exemplary embodiment.
Figure 22:
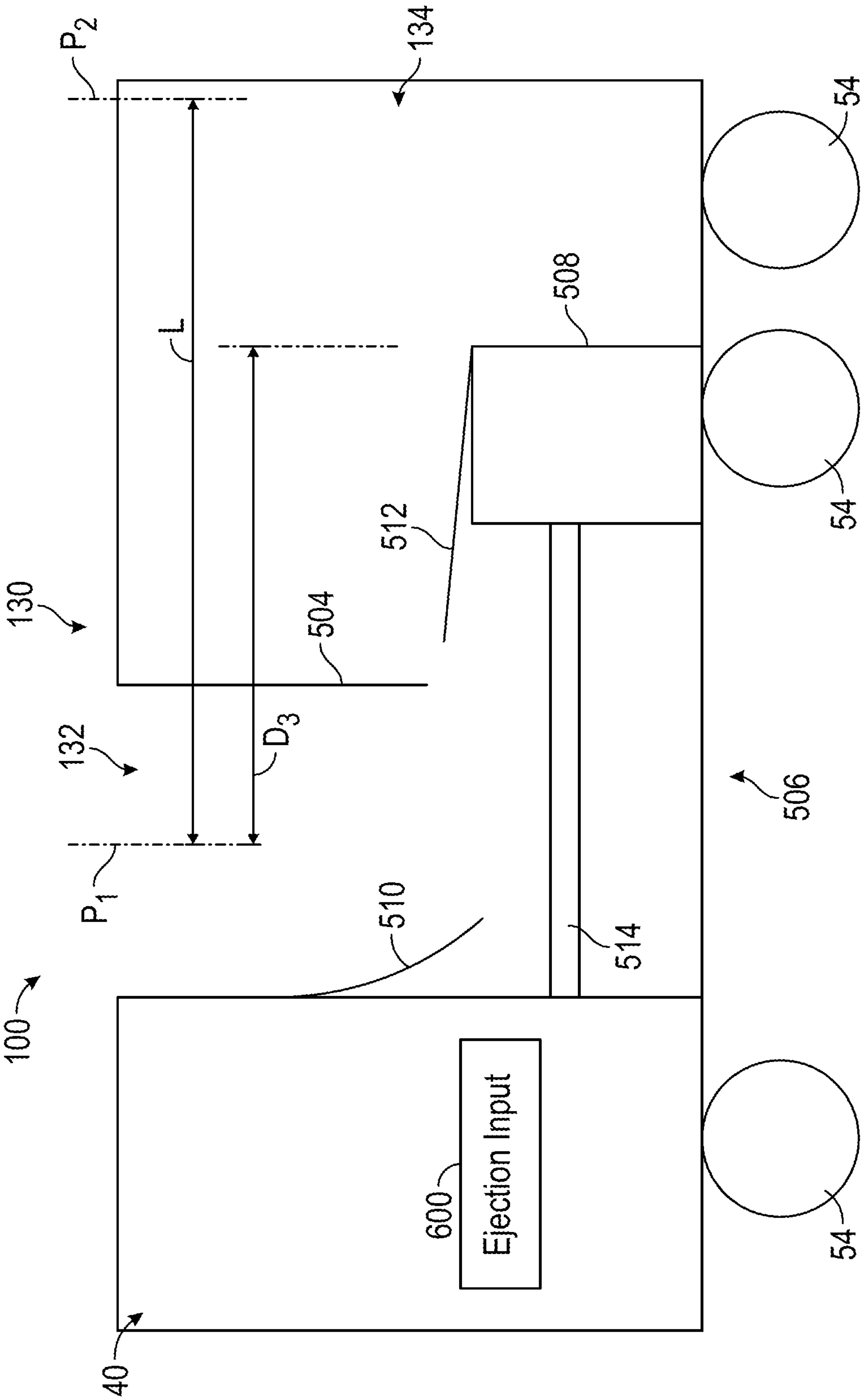
FIG. 22 is a schematic illustration of the side-loading refuse vehicle of FIG. 5 with a pack panel in a third position between a retracted position and an extended position, according to an exemplary embodiment.

Turning to FIGS. 20-22, the packing actuator 514 is configured to move the pack panel 508 to a first position (FIG. 20), a second position (FIG. 21), and a third position (FIG. 22) along the length L. The second position is between the first position and the third position, and the first position is closer to the retracted position than the third position. In the first position, the pack panel 508 moves a first distance $D_1$ from the retracted position. The first distance $D_1$ is defined between the initial plane P1 and the position of the pack panel 508 in the first position. In the second position the pack panel 508 moves a second distance $D_2$ from the retracted position. The second distance $D_2$ is defined between the initial plane P1 and the position of the pack panel 508 in the second position. In the third position, the pack panel 508 moves a third distance $D_3$ from the retracted position. The third distance $D_3$ is defined between the initial plane $P_1$ and the position of the pack panel 508 in the third position. The first distance $D_1$ is less than the second distance $D_2$, and the second distance $D_2$ is less than the third distance $D_3$.

During the ejection procedure, the packing actuator 514 can extend the pack panel 508 to any one of the first position, the second position, the third position, or any other position between the retracted position and the extended position. In some embodiments, the ejection procedure includes extending the pack panel 508 to the first position, the second position, the third position, and the extended position, and retracting the pack panel 508 back to the retracted position after reaching each of the first position, the second position, the third position, and the extended position. In some embodiments, the first position, the second position, and the third position sequentially position the pack panel 508 closer to the extended position. In some embodiments, the ejection procedure includes extending the pack panel 508 to the same position multiple times. For example, the ejection procedure includes extending the pack panel 508 to the first position, the second position, the third position, and/or the extended position at least two consecutive times. In some embodiments, the ejection procedure includes retracting the pack panel 508 back to a previous extended position, rather than all the way back to the retracted position. For example, the ejection procedure includes extending the pack panel 508 to the first position, retracting back to the retracted position, extending the pack panel 508 to the second position, retracting back to the first position, extending the pack panel 508 to the third position, retracting back to the second position, and extending to the extended position. In some embodiments, the ejection procedure includes retracting the pack panel 508 back to one of the extended positions, rather than all the way back to the retracted position. For example, the ejection procedure includes retracting the pack panel 508 back to the first position after reaching each of the second position, the third position, and the extended position.

In some embodiments, the first position, the second position, and the third position linearly increase in extension distance. For example, a ratio between the second distance $D_2$ and the first distance $D_1$ is about equal to a ratio between the third distance $D_3$ and the second distance $D_2$, In some embodiments, the first distance $D_1$ is about 25% of the length L, the second distance $D_2$ is about 50% of the length L, and the third distance $D_3$ is 75% of the length L. In some embodiments, the ejection procedure includes more or less than three extended positions prior to reaching the extended position. For example, the ejection procedure can include a first extension distance that is about 20% of the length L, a second extension distance that is about 40% of the length L, a third extension distance that is about 60% of the length L, and a fourth extension distance that is about 80% of the length L. In general, the gradual increase in extension distance, accompanied with retracting back to the retracted position after reaching each extension distance, helps maintain refuse in front of the pack panel 508 and prevents or inhibits refuse from falling behind the pack panel 508.

In some embodiments, the first position, the second position, and the third position nonlinearly increase in extension distance. For example, a ratio between the second distance $D_2$ and the first distance $D_1$ is less than a ratio between the third distance $D_3$ and the second distance $D_2$ In some embodiments, the first distance $D_1$ is between about 0% and about 10% of the length L, the second distance $D_2$ is between about 10% and about 30% of the length L, and the third distance $D_3$ is between about 60% and about 90% of the length L. In some embodiments, the first distance $D_1$ is between about 5% and about 15% of the length L, the second distance $D_2$ is between about 15% and about 35% of the length L, and the third distance $D_3$ is between about 60% and about 90% of the length L. In some embodiments, the first distance $D_1$ is between about 5% and about 20% of the length L, the second distance $D_2$ is between about 20% and about 40% of the length L, and the third distance $D_3$ is between about 60% and about 90% of the length L. In general, the smaller increase in extension distance between the first position and the second position, relative to the increase between the second position and the third position, helps maintain refuse in front of the pack panel 508 and prevents or inhibits refuse from falling behind the pack panel 508.

Regardless of the specific number of extension positions and the extension distance defined by each of the extension positions, the number and location of the extension positions traversed during the ejection procedure are predefined and stored in the memory 532. The controller 526 is configured to instruct the packing actuator 514 to execute the predefined ejection procedure stored in the memory 532. In this way, for example, the ejection procedure is automatically controlled and initiated by activation of the ejection input 600, which removes the need for a user of the vehicle 100 to manually control the ejection procedure and better controls the extension distances of the pack panel 508 to help prevent or inhibit refuse from falling behind the pack panel 508. It should be appreciated that although the properties and functionality of the ejection input 600 and the tailgate sensor 602 are described with reference to the side-loading configuration of the vehicle 100, the ejection input 600 and the tailgate sensor 602 are also capable of being incorporated into the front-loading configuration of the vehicle 100 to control the ejection procedure in the same manner.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A refuse vehicle comprising:

a chassis;

a cab coupled to the chassis;

a refuse compartment supported by the chassis and including a storage volume and a hopper volume;

a packing assembly including a pack panel and a packing actuator, wherein the packing actuator is configured to selectively move the pack panel between a retracted position and an extended position; and an ejection input configured to automatically initiate an ejection procedure upon activation of the ejection input, wherein the ejection procedure includes automatically extending the pack panel to a plurality of extended positions between the retracted position and the extended position, wherein the plurality of extended positions includes a first position, a second position, and a third position, wherein the first position, the second position, and the third position are positioned sequentially closer to the extended position, and wherein the pack panel is configured to retract back to the retracted position or the first position after extending to each of the second position and the third position.

2. The refuse vehicle of claim 1, wherein the ejection procedure includes extending the pack panel to the first position, the second position, the third position, or the extended position at least two consecutive times.

3. The refuse vehicle of claim 1, wherein the first position, the second position, and the third position linearly increase in extension distance toward the extended position.

4. The refuse vehicle of claim 1, wherein the first position, the second position, and the third position nonlinearly increase in extension distance toward the extended position.

5. The refuse vehicle of claim 1, further comprising:

a tailgate sensor configured to detect a position of a tailgate and provide an indication of whether the tailgate is in an open position or a closed position.

6. The refuse vehicle of claim 5, further comprising:

a controller including a processor and at least one memory, the controller being in communication with the ejection input, the packing actuator, and the tailgate sensor, the controller being configured to:

prevent the ejection input from initiating the ejection procedure if the tailgate sensor indicates that the tailgate is in the closed position.

7. The refuse vehicle of claim 6, wherein the controller is further configured to:

verify, via the tailgate sensor, that the tailgate is in the open position prior to initiating the ejection procedure.

8. A refuse vehicle comprising:

a chassis;

a cab coupled to the chassis;

a refuse compartment supported by the chassis and including a storage volume and a hopper volume;

a tailgate pivotally coupled to the refuse compartment and movable between an open position and a closed position;

a tailgate sensor configured to detect a position of the tailgate and provide an indication of whether the tailgate is in the open position or the closed position;

a packing assembly including a pack panel and a packing actuator, wherein the packing actuator is configured to selectively move the pack panel between a retracted position and an extended position during an ejection procedure; and a controller including a processor and at least one memory, the controller being in communication with the tailgate sensor and the packing actuator and being configured to:

receive an input corresponding to performing the ejection procedure based on activation of an ejection input;

determine if the tailgate is in the open position or the closed position;

in response to determining that the tailgate is in the closed position, prevent the packing actuator from performing the ejection procedure; and in response to determining that the tailgate is in the open position, automatically initiate the ejection procedure where the controller is configured to automatically instruct the packing actuator to:

sequentially extend the pack panel to a plurality of extended positions between the retracted position and the extended position, wherein the plurality of extended positions includes a first position, a second position, and a third position; and instruct the packing actuator to retract the pack panel to the retracted position or the first position after extending to each of the second position and the third position.

9. The refuse vehicle of claim 8, wherein the first position, the second position, and the third position are positioned sequentially closer to the extended position.

10. The refuse vehicle of claim 8, wherein the ejection procedure includes extending the pack panel to the first position, the second position, the third position, or the extended position at least two consecutive times.

11. The refuse vehicle of claim 8, wherein the first position, the second position, and the third position linearly increase in extension distance toward the extended position.

12. The refuse vehicle of claim 8, wherein the first position, the second position, and the third position nonlinearly increase in extension distance toward the extended position.

13. A method of initiating an ejection procedure on a refuse vehicle, the method comprising:

determining if a tailgate is in an open position or a closed position;

upon determining that the tailgate is in the closed position, preventing a packing actuator from extending past a retracted position; and upon determining that the tailgate is in the open position and receiving an activation of an ejection input, automatically initiating an ejection procedure, the ejection procedure comprising:

sequentially extending a pack panel to a plurality of extended positions between the retracted position and an extended position, wherein the plurality of extended positions includes a first position, a second position, and a third position; and retracting the pack panel to the retracted position or the first position after extending to each of the second position and the third position.

14. The method of claim 13, wherein the first position, the second position, and the third position sequentially position the pack panel closer to the extended position.

* * * * *